United States Patent [19]
Heinze et al.

[11] Patent Number: 6,038,099
[45] Date of Patent: Mar. 14, 2000

[54] MULTIPLE CARTRIDGE TAPE AUTO LOADER UTILIZING A DRIVE PLATE FOR POSITIONING OF DRIVE MECHANISM

[75] Inventors: Robert R. Heinze, San Clemente; John A. Hamming, Laguna Niguel, both of Calif.

[73] Assignee: Seagate Technology, Inc., Scotts Valley, Calif.

[21] Appl. No.: 08/892,538

[22] Filed: Jul. 14, 1997

[51] Int. Cl.[7] .................................................. G11B 15/68
[52] U.S. Cl. ................................................................ 360/92
[58] Field of Search ............................. 369/34, 36, 178, 369/191; 360/92

[56] References Cited

U.S. PATENT DOCUMENTS

| | | | |
|---|---|---|---|
| 3,183,494 | 5/1965 | Welsh | 360/92 |
| 3,852,818 | 12/1974 | Pyles | 360/92 |
| 4,622,610 | 11/1986 | Makigawa | 360/92 |
| 4,698,705 | 10/1987 | Umino | 360/92 |
| 4,918,548 | 4/1990 | O'Donnell et al. | 360/92 |
| 5,231,552 | 7/1993 | Schneider et al. | 360/92 |
| 5,337,297 | 8/1994 | Kvifte et al. | 369/36 |
| 5,402,285 | 3/1995 | Theobald, Jr. et al. | 360/69 |
| 5,450,391 | 9/1995 | Pollard | 369/191 |
| 5,576,911 | 11/1996 | Porter | 360/98.06 |

*Primary Examiner*—William Klimowicz
*Attorney, Agent, or Firm*—McDermott, Will & Emery

[57] ABSTRACT

A compact tape autoloader fitting within a 5¼" form factor is disclosed. The tape autoloader moves a read/write head into close proximity with a selected one of a plurality of tape cartridges stored in a magazine. The tape cartridge is then moved a small distance for read/write operations. The tape cartridge is retained/released by a cartridge retaining mechanism. A picking mechanism engages the tape cartridge for movement to/from the magazine. A clamping mechanism clamps the released tape cartridge into a specific location in alignment with the read/write head. A cartridge door opening mechanism opens a tape cartridge door so that the tape can be brought into engagement with the read/write head.

15 Claims, 25 Drawing Sheets

FIG. 14A(1)

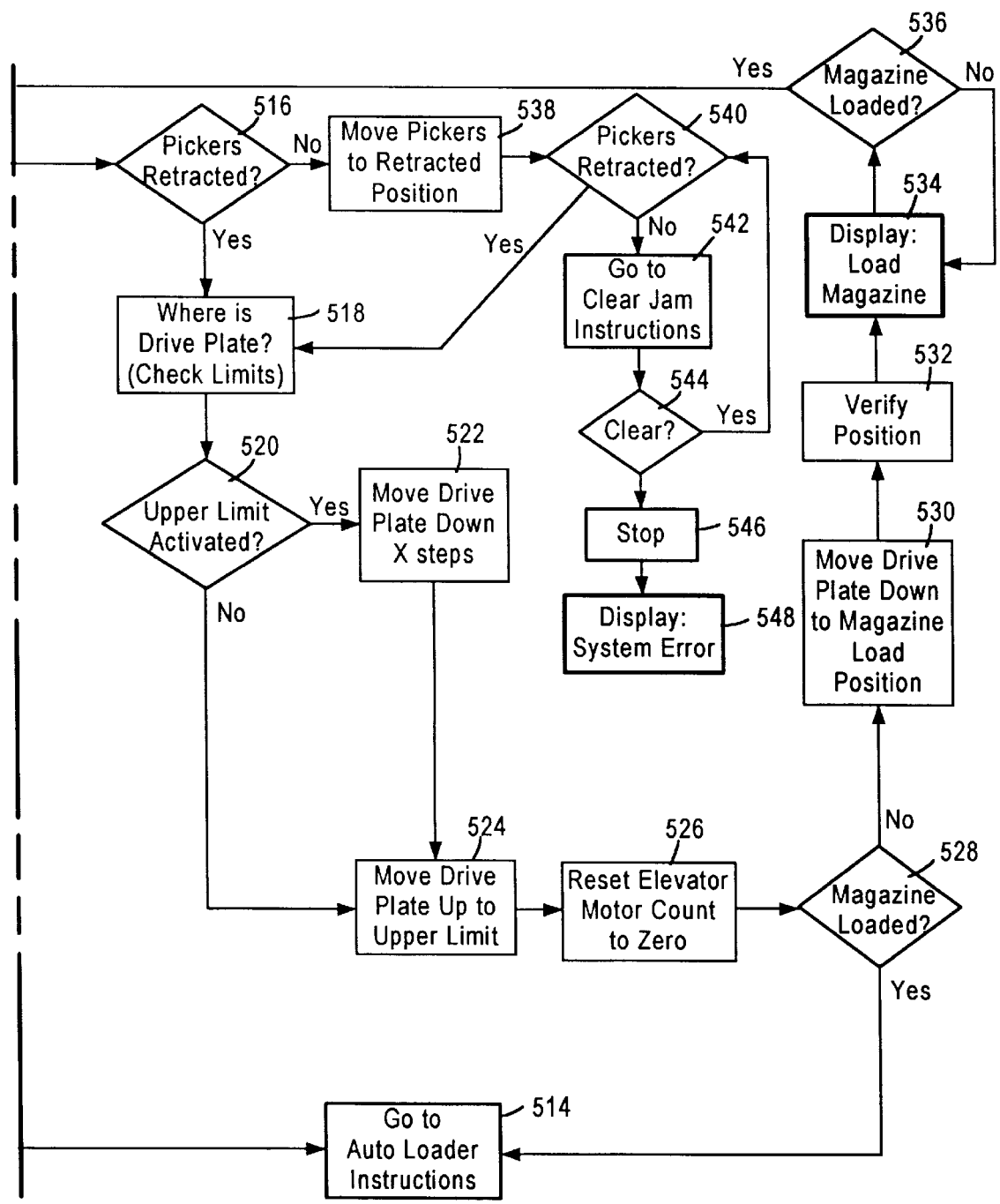
FIG. 14A(2)

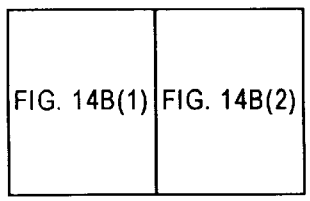
FIG. 14B
FIG. 14B(1)
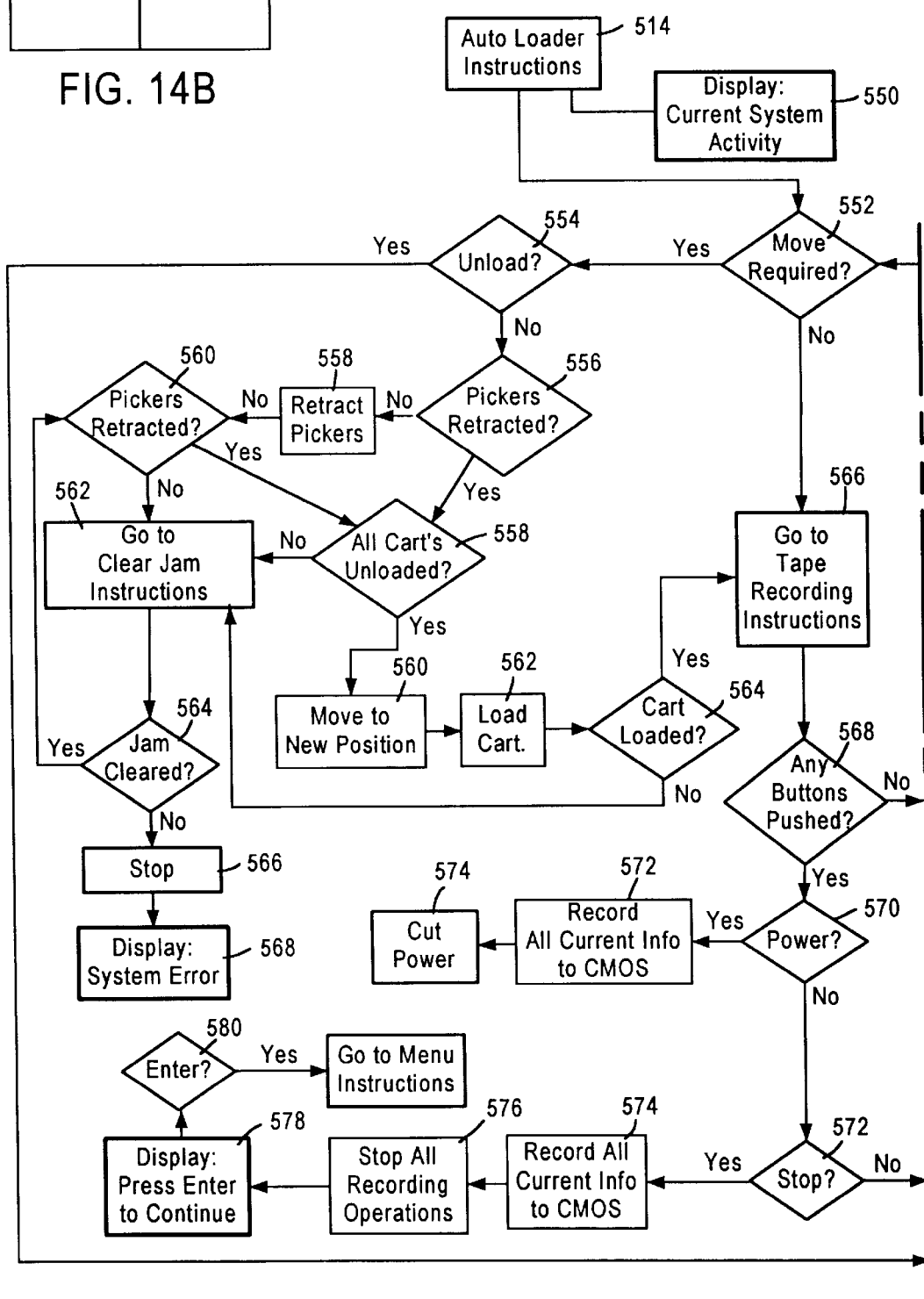

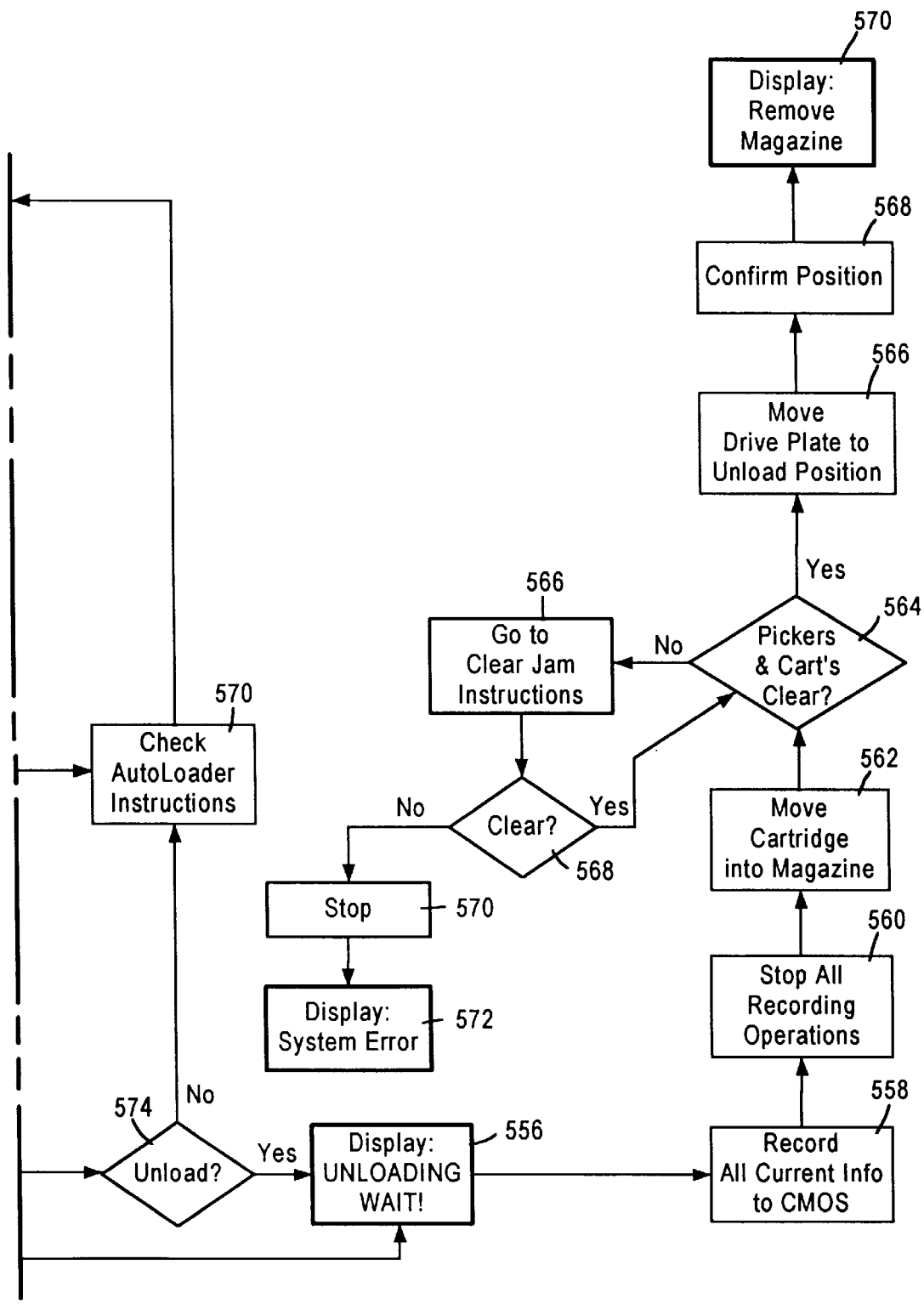
FIG. 14B(2)

MULTIPLE CARTRIDGE TAPE AUTO LOADER UTILIZING A DRIVE PLATE FOR POSITIONING OF DRIVE MECHANISM

FIELD OF THE INVENTION

The present invention relates generally to peripheral memory storage devices for computer systems, and more particularly, to tape drive systems in which a read/write head is moved in close proximity for read/write operations to a selected one of a plurality of tape cartridges stored within a magazine.

DESCRIPTION OF RELATED ART

With the advent of personal computer systems in the early 1980s, a de facto industry standard was established which requires that hard disk drives, floppy disk drives and tape drives fit within a rectangular space measuring approximately 3¼" in height by 5¾" in width by 8" in length. This standard is hereinafter referred to as the "full height 5¼ inch form factor." An example of a digital audio tape (DAT) drive which fits into this form factor and utilizes a DAT tape cartridge is disclosed in U.S. Pat. No. 5,402,285 to Theobald, Jr. et al owned by Seagate Technology of Scotts Valley, Calif., USA. Another example of a tape drive which fits into this form factor and utilizes a DC 600 tape cartridge is disclosed in U.S. Pat. No. 4,573,091 to Barden et al. and is currently assigned to Seagate Technology.

The system of U.S. Pat. No. 5,402,285 discloses an arrangement in which the entire cassette magazine is moved vertically to the tape head so that a particular cartridge can be selectively transferred between the magazine and the cartridge insertion slot of the DAT tape drive. This results in a housing which is not as compact as possible. Further, to load a magazine into the housing a drawer is mounted for sliding motion to an open, extended position outside of the periphery of the housing so that tape cartridges and/or cartridge magazines can be loaded into the drawer. This results in an autoloader which does not fit within the full height 5¼" form factor when the drawer is in the open position. Generally, most existing autoloaders move the tape cartridges to the read/write head, requiring complex mechanisms. Therefore, there is a need for a relatively compact tape autoloader.

An additional problem encountered in the prior art has been the difficulty of moving tape cartridges to the tape head drive, in part because of the bulkiness of the tape cartridges themselves. This is a particularly acute problem for a Travan tape cartridge which does not have any surfaces which are relatively easy for a mechanism to engage for moving the Travan tape cartridge.

SUMMARY OF THE INVENTION

It is, therefore, an object of the present invention to provide a tape autoloader which will fit within the full height 5¼" form factor when loaded with tape cartridges.

Yet another object of the present invention is to provide a tape autoloader in which there is very little movement of the tape cartridge from a position within the cartridge magazine to a read/write position.

Still another object of the present invention is to provide a tape autoloader having mechanisms which move the drive head vertically between tape cartridges.

These and other objects are achieved by embodiments of the present invention which provide a tape autoloader assembly having a magazine assembly for holding a plurality of tape cartridges each located at a respective spaced position. A drive assembly is provided that is movable to the respective spaced positions of each of the tape cartridges and includes a read/write head for reading/writing information onto/from each of the respective cartridges. A cartridge loading mechanism is movable with the drive assembly that moves a tape cartridge at a respective spaced position from the magazine assembly to the read/write head.

In a preferred embodiment, a picker mechanism engages the tape cartridge in the magazine assembly and moves the tape cartridge in a direction towards the tape drive head. The tape cartridge is then clamped into engagement with the tape drive head by a clamping mechanism that also accurately locates the tape cartridge in the vertical direction.

The earlier stated objects are also achieved in a method of engaging a tape cartridge with a tape drive head both of which are located within a tape autoloader. The method includes locating at least one tape cartridge in one of several spaced positions in a tape magazine within the autoloader. The tape drive head is first moved to a position corresponding to the respective position of the tape cartridge in the tape magazine. The tape cartridge is then translated to the tape drive head so that read/write operations can be performed.

Another embodiment of the invention provides a mechanism for moving a tape cartridge within a tape autoloader from a non-engaged position to a docked position engaged with a read/write head. The mechanism includes a pair of pickers engageable with the tape cartridge. A pair of picker pullers are each engaged with a picker for moving the pickers. A gear is engaged with the pair of picker pullers. A motor drives the gear and the picker pullers.

The earlier stated objects are also achieved by a mechanism for clamping a tape cartridge into a docked position with a read/write head in a tape autoloader. The mechanism includes a drive plate and a pair of clamp arms pivotably mounted to the drive plate and having an unclamped position not engaged with the tape cartridge and a clamped position where the pair of clamp arms engage the tape cartridge. A cross arm is spaced from the pair of clamp arms. A motor moves the cross arm relative to the clamp arms from a forward position to a rearward position; the cross arm causing the pair of clamp arms to move to/from the unclamped position and the clamped position.

Still other objects and advantages of the present invention will become readily apparent to those skilled in this art from the following detailed description wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

For a more complete understanding of the invention and advantages thereof, reference is now made to the following description taken in conjunction with the accompanying drawings in which like reference numbers indicate like features and wherein:

FIGS. 14a and 14b collectively comprise a flow diagram illustrating an exemplary embodiment of a control program executed by the loader control circuit in order to sense a plurality of failure modes and respond with a plurality of predetermined corrective actions.

DETAILED DESCRIPTION OF THE PREFERRED EMBODIMENTS

Figure 1:
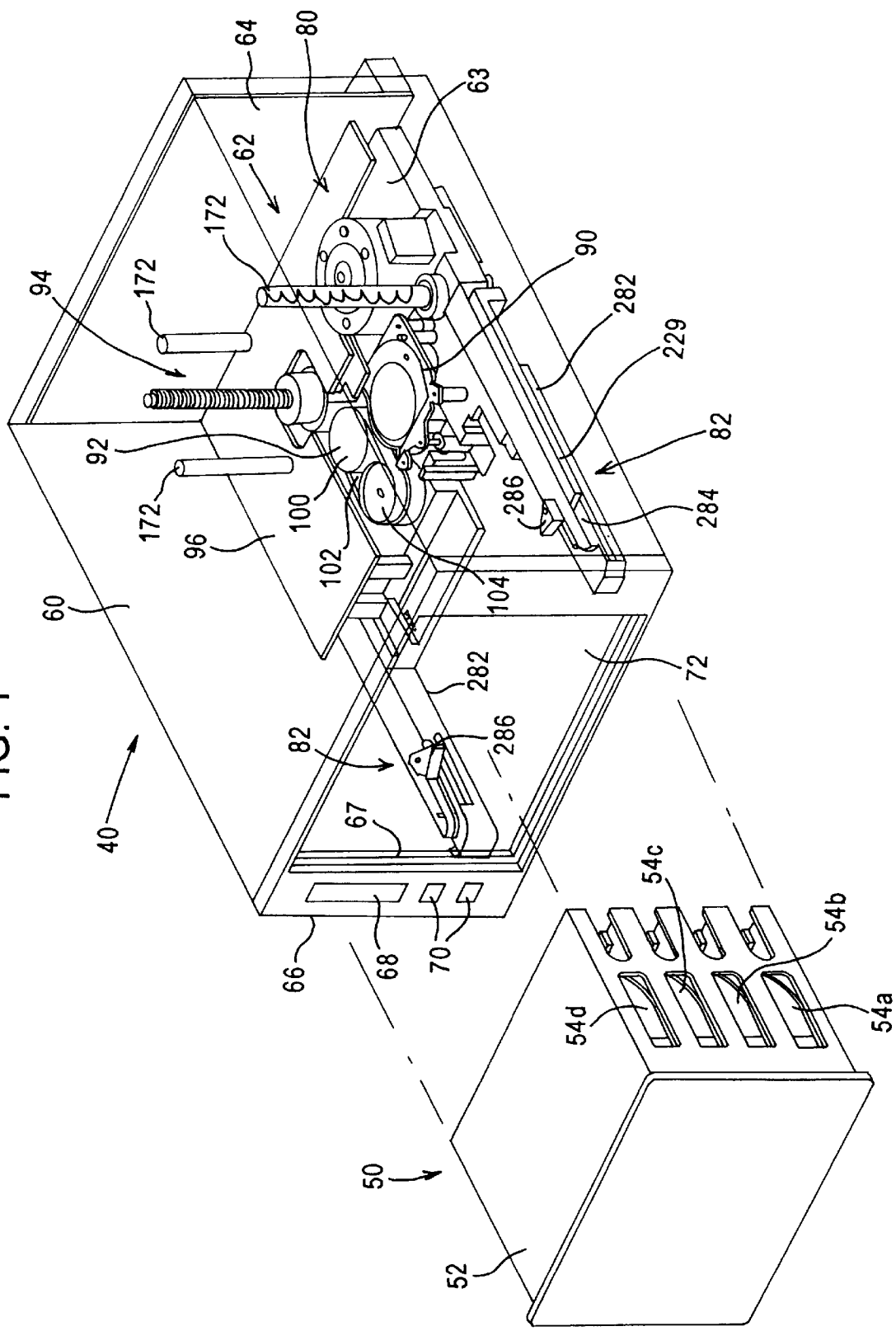
FIG. 1 is a perspective view of a preferred embodiment of a 5¼ inch form factor combination tape autoloader with a magazine assembly depicted in an unloaded position with a bi-fold door of a housing assembly depicted in an open position.

Refer now to FIG. 1 where a tape autoloader, generally indicated at 40, is illustrated which is constructed in accordance with the principles of the present invention. For convenience, the tape autoloader will be described in relation to the orientation illustrated in FIG. 1, and consequently, terms such as "above," "below," "left," "right," "forward" and "rearward" etc. as used herein are to be construed in the relative sense. It is to be understood that although the present invention has been described using Travan tape cartridges, the present invention is equally applicable to other tape formats. Throughout the specification the term "cartridge" shall be construed to also include "cassette."

As disclosed herein, standard Travan quarter inch tape cartridges are used although the present invention is readily adaptable to other tape cartridges, such as digital audio tapes (DAT's). In this regard, the tape autoloader according to the exemplary embodiment has been adapted to accommodate the exterior configuration of the Travan tape cartridges.

Referring to FIG. 1, tape autoloader 40 includes a generally rectangular magazine assembly 50 and a generally rectangular tape drive housing assembly 60. Magazine assembly 50 includes a one piece magazine housing 52 (made of plastic, for example) having four horizontal slots therein for each receiving a standard Travan tape cassette 54a, 54b, 54c, 54d in a horizontal orientation. The Travan tape cassettes are vertically stacked directly above each other in the magazine housing 52. The magazine housing 52 has an unloaded position depicted in FIG. 1 and also has a loaded position in which magazine housing 52 is received in housing assembly 60. Cassettes 54 used in the exemplary illustrated embodiment are conventional commercially available Travan cassettes available from the Imation Company.

The housing assembly 60 has height, width and length dimensions such that the outer dimensions thereof are fully contained within the full height 5¼" form factor.

Figure 2:
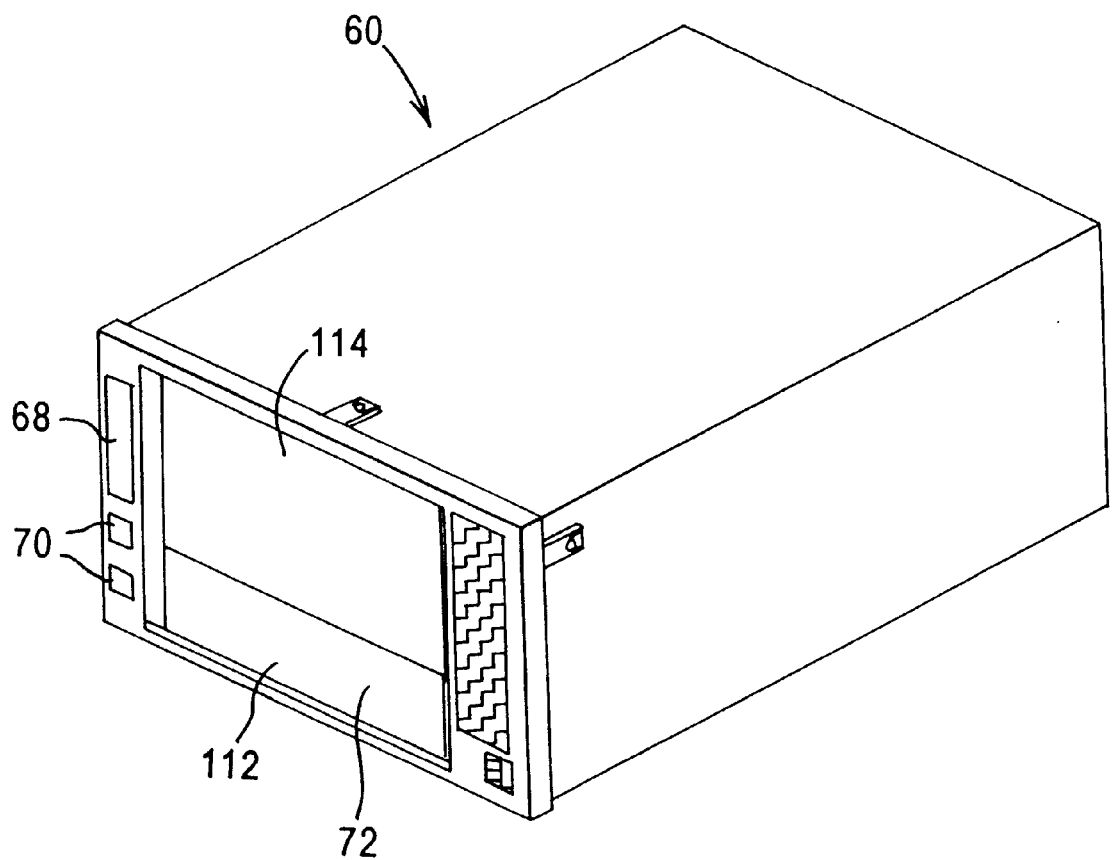
FIG. 2 is a perspective view of the tape autoloader of FIG. 1 showing the bi-fold door in a closed position.

A drive plate assembly 62 having a drive plate 63 is vertically movable within housing assembly 60. A printed circuit board 64 forms the rear wall of housing assembly 60. A bezel assembly 66 forms a front wall of housing assembly 60 and has a rectangular opening 67 formed therein for receiving magazine assembly 50. An LCD 68 is located on a left portion of bezel assembly 66. Control buttons 70 are located on a left portion of bezel assembly 66 and are used by an operator to control the operation of tape autoloader 40. A bi-fold door 72, as depicted in FIG. 2 is used to close opening 67 when the magazine assembly 50 is not loaded therein. Bi-fold door 72 also has a folded open position for allowing magazine assembly 50 to be received in the tape autoloader 40 without interfering with the movement of the magazine assembly 50. Magazine assembly 50 has four slots therein for each receiving a standard ¼ inch Travan cassette such as 54 in horizontal orientation. The Travan cassettes are vertically stacked directly above each other in the magazine housing 52. Each Travan tape cartridge may hold for example, eight gigabytes of information. The outer configuration of the known Travan cartridge is governed by applicable standards such as QIC.

Figure 3:
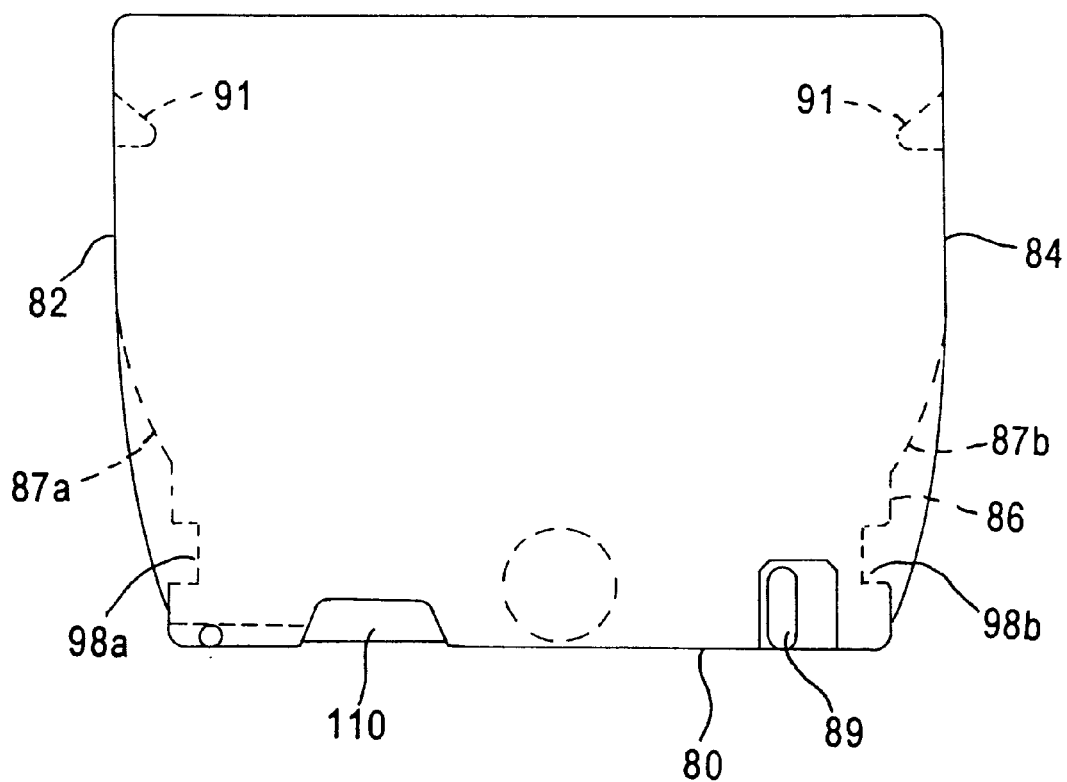
FIG. 3 is a top plan view of a Travan tape cartridge with certain features depicted with dashed lines for clarity.

As depicted in FIGS. 1 and 3, magazine housing 52 may be constructed of rigid molded plastic, or of any other suitable material. The magazine housing 52 defines a plurality of slots each of which is capable of holding one cassette 54. Preferably, the magazine housing 52 contains four cartridges 54. The slots in the magazine housing 52 are only slightly wider than the width of the cassettes 54, so as to minimize the size of the magazine housing 52 and to prevent excess motion of the cartridges 54 therein.

When magazine assembly 50 is loaded into housing assembly 60, the tape drive assembly, to be described in detail below, is movable to four different vertical positions corresponding to a respective position of each of the tape cartridges 54a, 54b, 54c, 54d. Advantageously, the tape drive head is moved to a vertical position corresponding to each of the tape cartridges such that almost no vertical movement of the cartridges is required and very little horizontal movement (0.9 inches) of the tape cartridges is required. In order to move a particular tape cartridge 54 from the magazine assembly 50, the tape autoloader 40 moves the tape cartridge 54 horizontally to the vertically positioned drive assembly 62 so that read/write operations can be performed on the tape.

Once a magazine assembly 50 having tape cartridges 54 therein is loaded into the housing assembly 60, each respective tape cartridge 54 needs to be moved from a loaded position within magazine housing 52 to a docked read/write position with the tape drive head 90 before reading/writing. In order to accomplish this, four operations are performed in the exemplary described embodiment. Each of these operations will be described in greater detail below.

The first operation is a tape cartridge release operation to release the tape cartridge 54 which is securely held in the magazine housing 52 so that the tape cartridge 54 can be moved rearwardly towards the tape drive head assembly 90. The second operation is a "picking" or loading operation in which a pair of pickers or arms engage the tape cartridge 54 and move the tape cartridge 54 rearwardly toward the tape head 90 (see FIGS. 9a–9b). The third operation requires the opening of a cartridge door 110a (FIGS. 10a–10e) of the tape cartridge so that the tape cartridge 54 can be brought into position for tape access by the tape drive head assembly 90 to perform read/write operations. The fourth operation is a clamping operation in which the tape cartridge 54 is moved and clamped into a particular X, Y, Z location to properly engage the quarter inch tape with a tape drive head assembly 90 (see FIGS. 11a–11g). Advantageously, as described in detail below, the four operations can be accomplished by approximately three rotations of a single drive motor. Movement of the tape drive head assembly 90 to a particular vertical location corresponding to a tape cartridge vertical position is accomplished advantageously by a separate elevator assembly having a separate motor (see FIGS. 7–8).

Referring to FIG. 1, a loader control circuit is mounted on printed circuit board 64 and includes a microprocessor and at least one memory chip for storing an operation program. The microprocessor executes this operation program and through standard drive circuits energizes a drive motor assembly 80 for moving a tape cartridge 54 from magazine housing 52 as hereafter described. The foregoing operations are provided by a drive motor assembly, generally indicated at 80, a picker mechanism, generally indicated at 82, a clamping mechanism, generally indicated at 84 (FIG. 8), a cartridge release mechanism, generally indicated at 86, (FIGS. 8a–8f and 12a–12f) and a door opening mechanism, generally indicated at 88 (FIGS. 8a–8f and 10a–10e). A conventional commercially available tape head drive assembly manufactured by Seagate is indicated at 90 along with a conventional commercially available capstan assembly 92. An elevator assembly 94 serves to move the drive plate assembly 62 to four different vertically spaced locations generally aligned with a particular one of tape cartridges 54a, 54b, 54c, 54d. A printed circuit board for controlling the various components of the tape drive including the head assembly 90 and capstan assembly 92 is indicated at 96.

Capstan assembly 92 includes a conventional drive motor 100 which drives a belt 102 which in turn drives a capstan pulley 104. Capstan pulley 104 engages with a plastic pulley 105 (FIGS. 8a–8f) in the tape cartridge 54 in a conventional manner to drive a quarter inch tape contained within tape cartridge 54.

The magazine assembly 50 is inserted into a loaded position within housing assembly 60 so that its slots open towards the tape drive head assembly 90. Magazine assembly 50 is inserted until a surface of the assembly 50 hits a stop 65 (FIG. 5) in the tape autoloader housing. The rear face of magazine housing 52 is solid thereby preventing dust and debris from entering the enclosure.

In FIG. 2 bi-fold door 72 is depicted in the closed position. Bi-fold door 72 includes a lower door portion 112 hingedly mounted to housing assembly 60 at a bottom edge thereof and hingedly attached to upper door portion 114.

An example of a single tape cartridge 54 is depicted in top plan view in FIG. 3. Cartridge 54 has a front surface 80, a left surface 82, a right surface 84 and a bottom surface 86. A pair of left and right curved surfaces 87a, 87b extend inwardly from left and right surfaces 82, 84, respectively. A pair of generally triangularly shaped vertically extending notches 91 are formed in a rear portion of cartridge 54 and extend inwardly from left and right surfaces 82, 84, respectively. A pair of rectangular notches 98a and 98b are formed in bottom surface 86 inwardly of curved walls 87a and 87b. Tape cartridge 54 has a conventional movable read/write tab 89 on front surface 80 for preventing inadvertent write operations from being performed.

Figure 4:
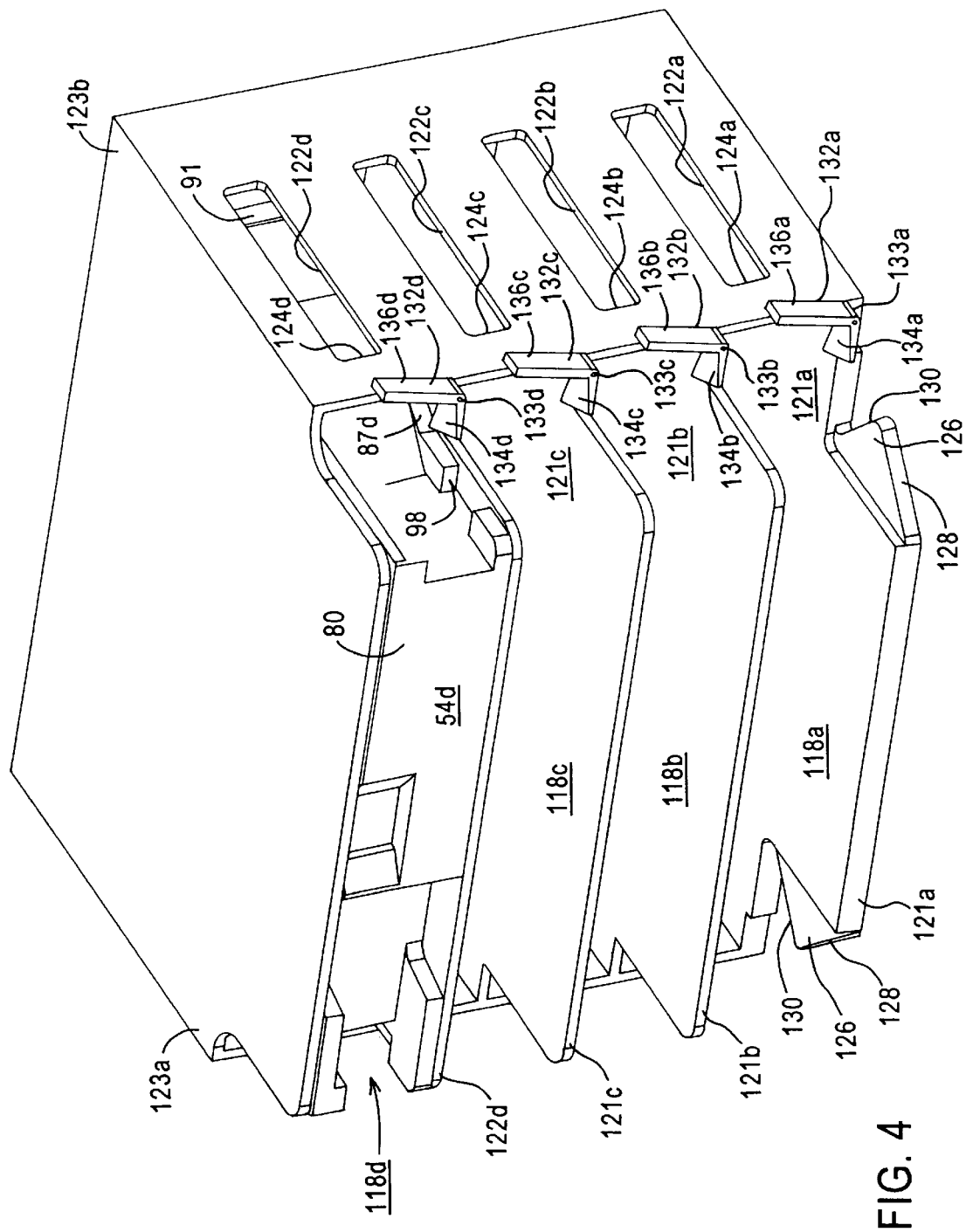
FIG. 4 is a front perspective view of the magazine housing with a shelf shown in an exploded position with one tape cartridge loaded therein.

In FIG. 4 magazine housing 52 depicts showing horizontal shelves 121a, 121b, 121c, 121d forming horizontal slots 118a, 118b, 118c, 118d, defined therebetween. Horizontal elongated slots 122a, 122b, 122c, 122d are located on left and right sides 123a, 123b of magazine housing 52 above a corresponding shelf 121. Each of the slots 122 is centrally located vertically relative to cartridges 54. A forward edge of each of the slots 122 terminates with a respective wall 124a, 124b, 124c, 124d. Notches 91 of cartridges 54a, 54b, 54c, 54d are accessible through the slots. Extending outwardly from a bottom edge of magazine housing 52 in a horizontal direction on opposite sides thereof are a pair of horizontally extending clamp triangles 126 each having a triangular shape. Each triangle 126 has a forward edge 128 extending from a front surface of magazine housing 52 and a rear edge 130. Clamp triangles 126 are located vertically below slot 122a and each is located inwardly from sides 123a, 123b near the front of magazine housing 50.

As depicted in FIG. 4, four L-shaped cartridge locking arms 132a, 132b, 132c, 132d are provided on the right side of magazine housing 52 for retaining respective tape cartridge 54a, 54b, 54c, 54d in magazine assembly 50. Each cartridge locking arm 132a, 132b, 132c, 132d has an engagement portion 134a, 134b, 134c, 134d for engaging with a respective curved surface 87 for preventing the forward movement a respective cartridge 54 within magazine assembly 50. Each cartridge locking arm 132 is mounted to right side 123b by a pin 133a, 133b, 133c, 133d where each pin is at a height corresponding to a respective shelf 121a, 121b, 121c, 121d. Each engagement portion 134a, 134b, 134c, 134d is biased into the position shown in FIG. 4 by a torsion spring (not shown). In the normal position, depicted in FIG. 4, engagement portion 134a, 134b, 134c, 134d extends upwardly from a respective shelf 121a, 121b, 121c, 121d at a slight angle thereby preventing the forward movement of tape cartridge 54. Release portion 136a, 136b, 136c, 136d extends outwardly beyond the sidewall 123b of magazine assembly 50 at a slight angle therefrom.

Figure 5:
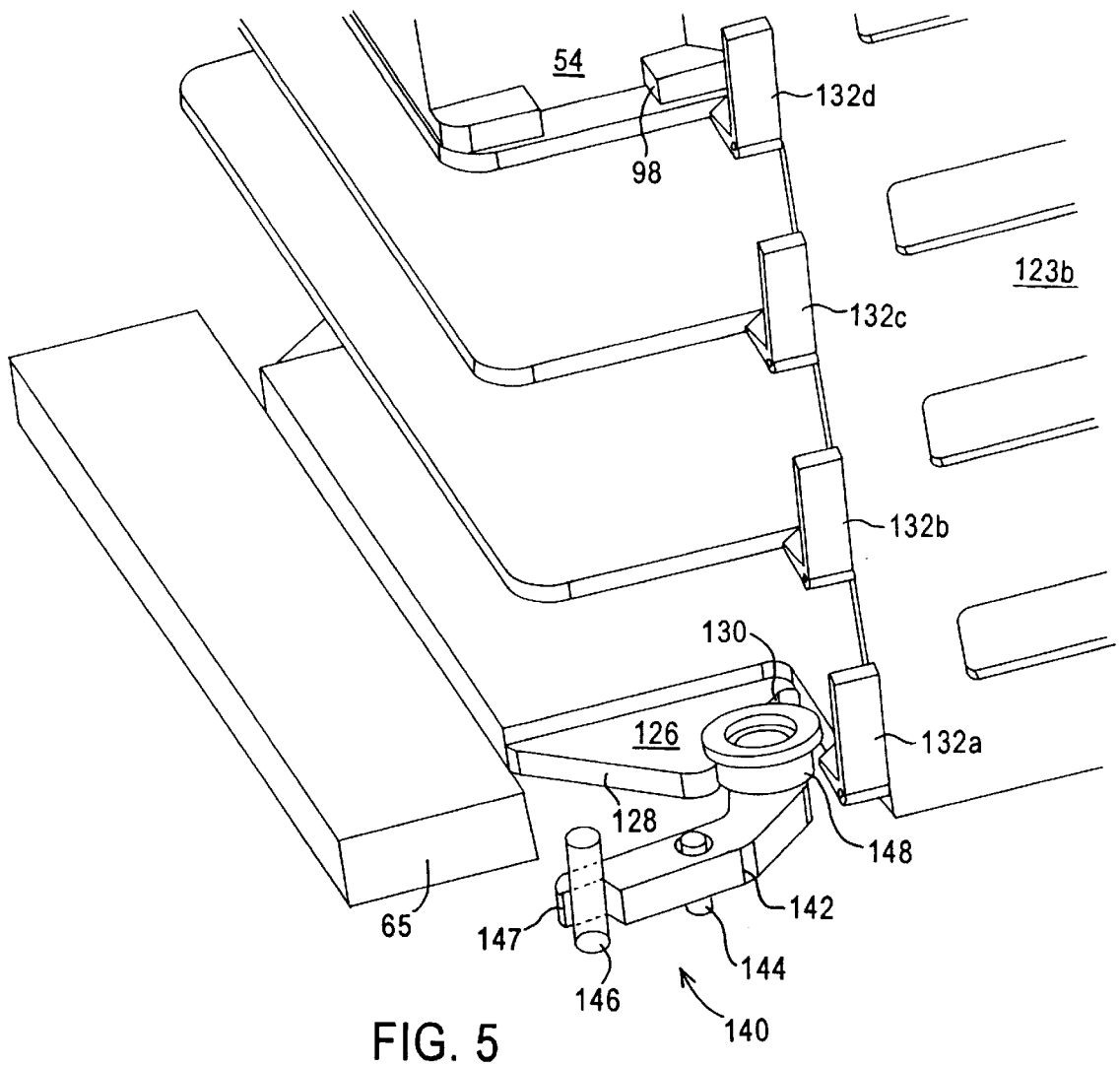
FIG. 5 is a partial side perspective view of the magazine housing, a cartridge retaining mechanism and a magazine clamping mechanism.

In FIG. 5 a magazine clamping assembly 140 is depicted. For the sake of simplicity only one such assembly 140 will be illustrated and described herein although two such assemblies would be used in the invention. Each assembly 140 works in conjunction with clamp triangle 126 to retain the magazine assembly 50 within housing assembly 60. Magazine clamping assembly 140 is mounted within housing 60 on a bottom wall thereof at a position to correspond with clamp triangle 126. The magazine clamping assemblies 140 are symmetrically spaced apart and are partially located inwardly of side walls 123a, 123b of magazine housing 52 after the magazine housing 52 is installed.

Assembly 140 includes a clamp arm 142 pivotable on pivot point 144 and having one end thereof biased towards fixed shaft 146 and roller 148 biased towards magazine assembly 50 by a torsion spring 150 (not shown). When no magazine assembly 50 is present within housing 60 torsion spring 150 biases end 147 into contact with fixed shaft 146. When a magazine assembly 50 is loaded into housing assembly 60, the forward edge 128 of clamp triangle 126 contacts roller 148 and the force exerted by the operator and the shape of forward edge 128 urges roller 148 outwardly in a direction away from magazine assembly 50 until roller 148 is urged toward magazine assembly 50 by torsion spring 150 and is brought into contact with rear edge 130. Once installed, the clamp assembly 140 maintains the magazine assembly 50 in its forward most position during autoloader 40 operation.

The removal of magazine assembly 50 is the opposite of that of inserting it into housing assembly 60. The operator pulls magazine assembly 50 rearwardly and outwardly. The force exerted by the operator and the shape of rear edge 130 urges roller 148 outwardly in a direction away from magazine assembly 50 until roller 148 is brought into contact with front edge 128 and eventually into contact with side 123a until magazine assembly 50 is removed from housing assembly 60.

Figure 6:
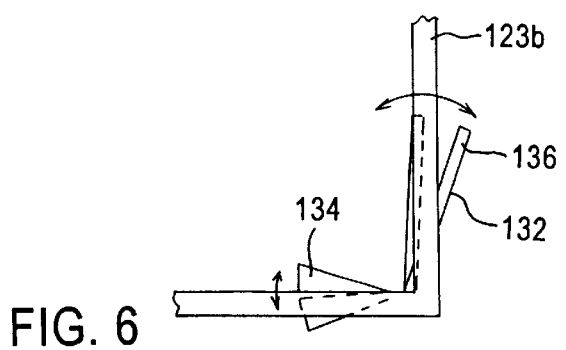
FIG. 6 is a schematic front elevational view of the cartridge retaining mechanism illustrating movement to and from a retaining position and a released position.

As depicted in FIG. 6, L-shaped cartridge locking arms 132 are movable between a normal position (solid lines)
preventing forward movement of the cartridge 54 and a retracted position (dashed lines) allowing forward movement of the cartridge. Cartridge release mechanism 86 causes the movement of locking arms 132 as described hereinafter.

Figure 7:
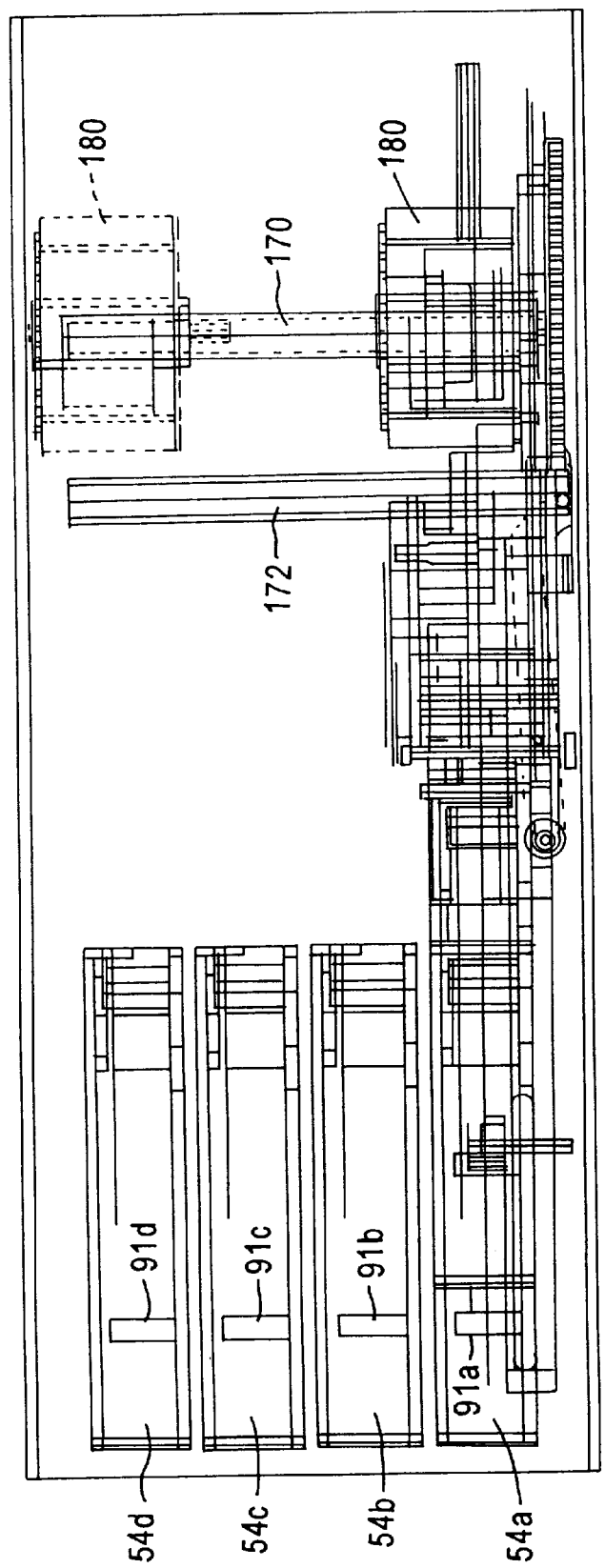
FIG. 7 is a schematic side elevational view of the tape autoloader depicting the tape drive assembly in the lowermost position and showing the drive motor only in dashed lines in an uppermost position.

FIG. 7 schematically depicts the movement of part of drive motor assembly 180 from a first, lowermost position to a fourth, uppermost position having bypassed intermediate second and third vertical positions. The entire drive motor assembly 180 along with other parts of the mechanism herein described moves along a lead screw elevator shaft 170 which extends in a vertical position and is threadedly engaged with an elevator assembly described below.

As depicted in FIG. 7 an additional guide shaft 172 is used to prevent twisting and binding of the drive assembly. As depicted in FIG. 1 two additional guide shafts 172 may preferably be used and should be spaced relatively far apart to provide guidance and prevent binding of the drive plate assembly 62 as it moves vertically. In this regard, it is important to distribute the weight of the components on drive plate 63 to prevent binding. It is also envisioned that the read/write lead 90 can be moved horizontally into engagement with tape cartridge 54.

Figure 8A:
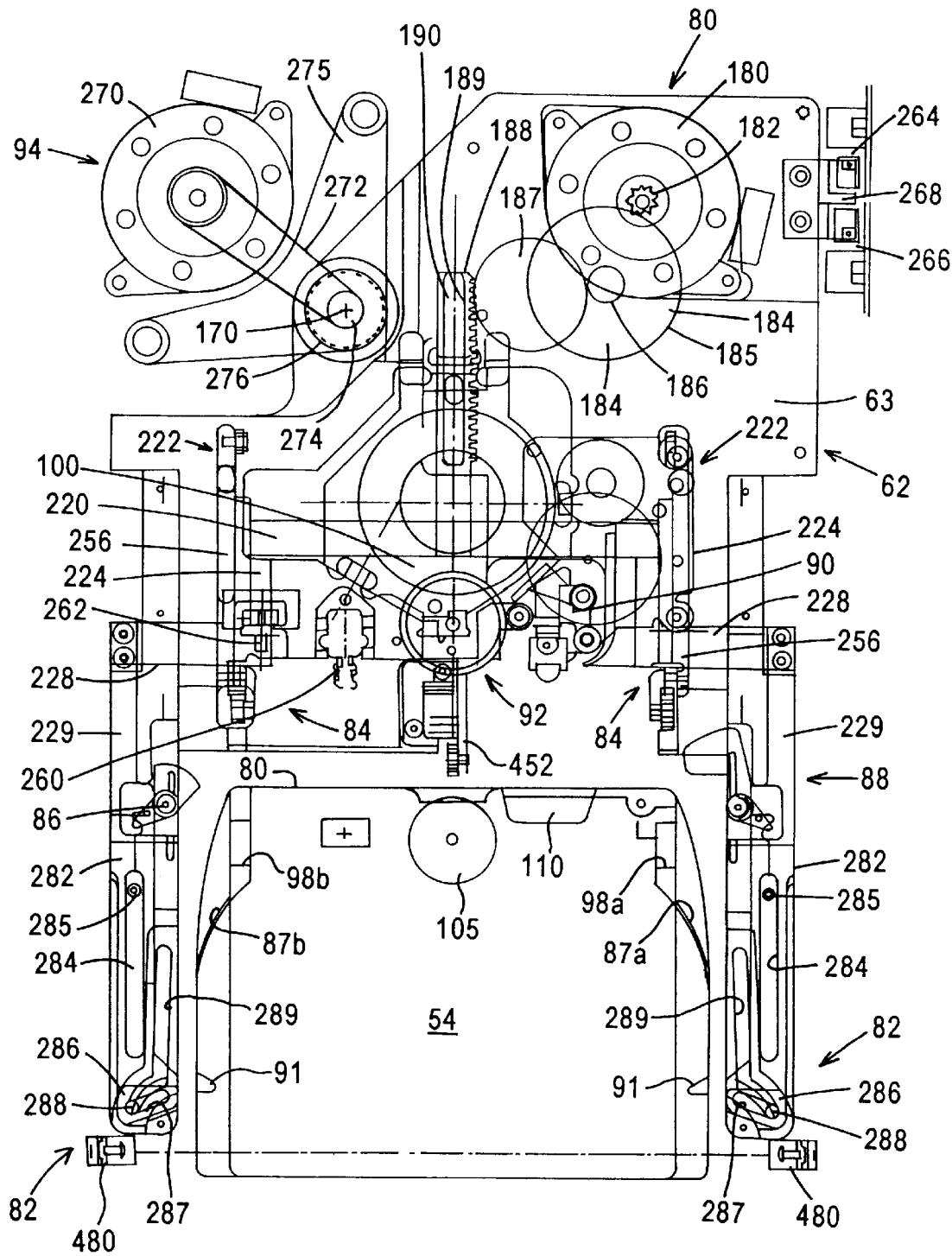
FIG. 8a is a top plan view of the tape autoloader mechanisms including a picker puller mechanism, clamping mechanism and elevator mechanism depicted with the tape cartridge in a retracted position.
Figure 8B:
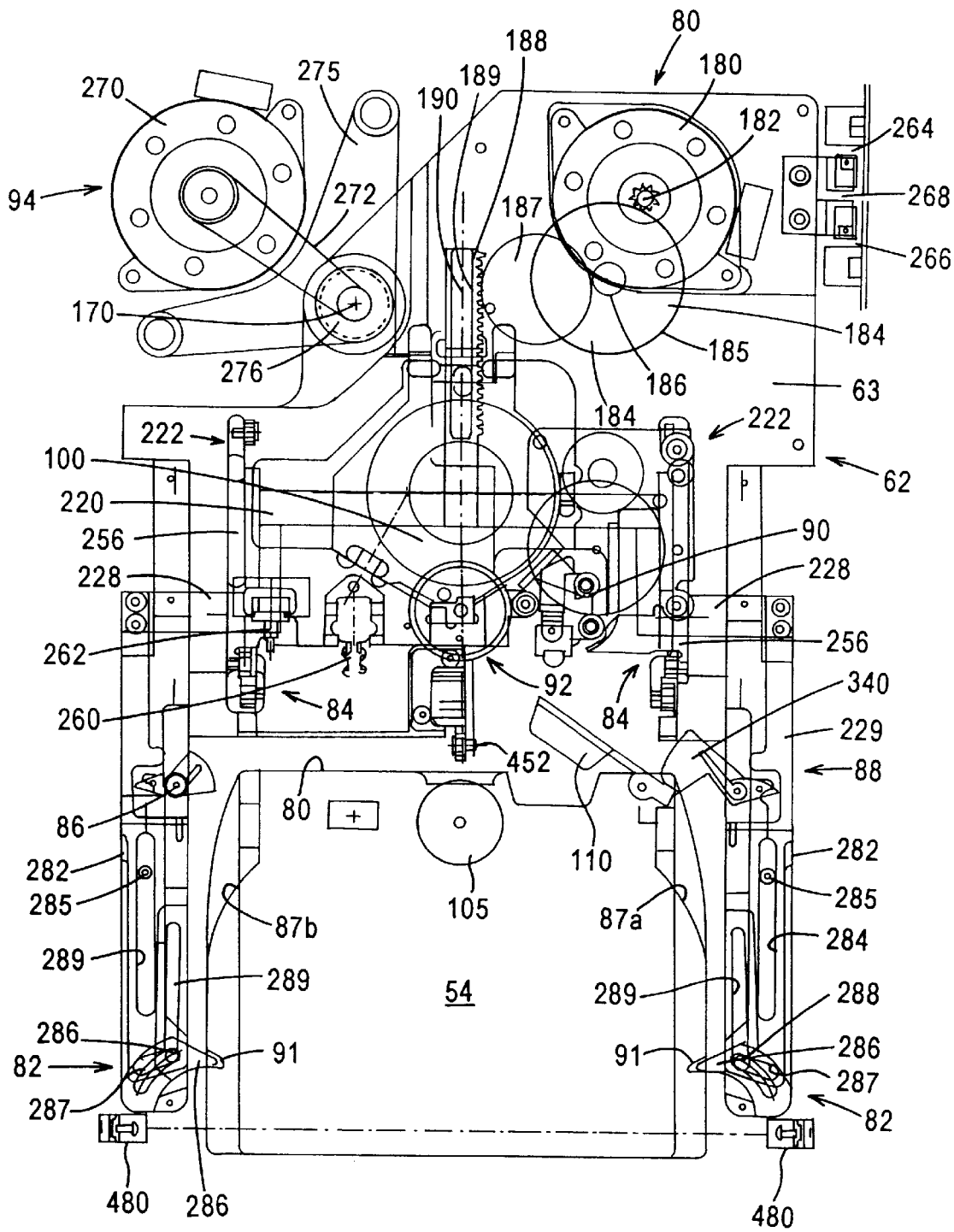
FIGS. 8b–8e are top plan views of the tape autoloader mechanism of FIG. 1 depicting the tape autoloader mechanism in various stages of moving the tape cartridge from a loaded position in the magazine housing to a fully engaged position with the read/write head.
Figure 8C:
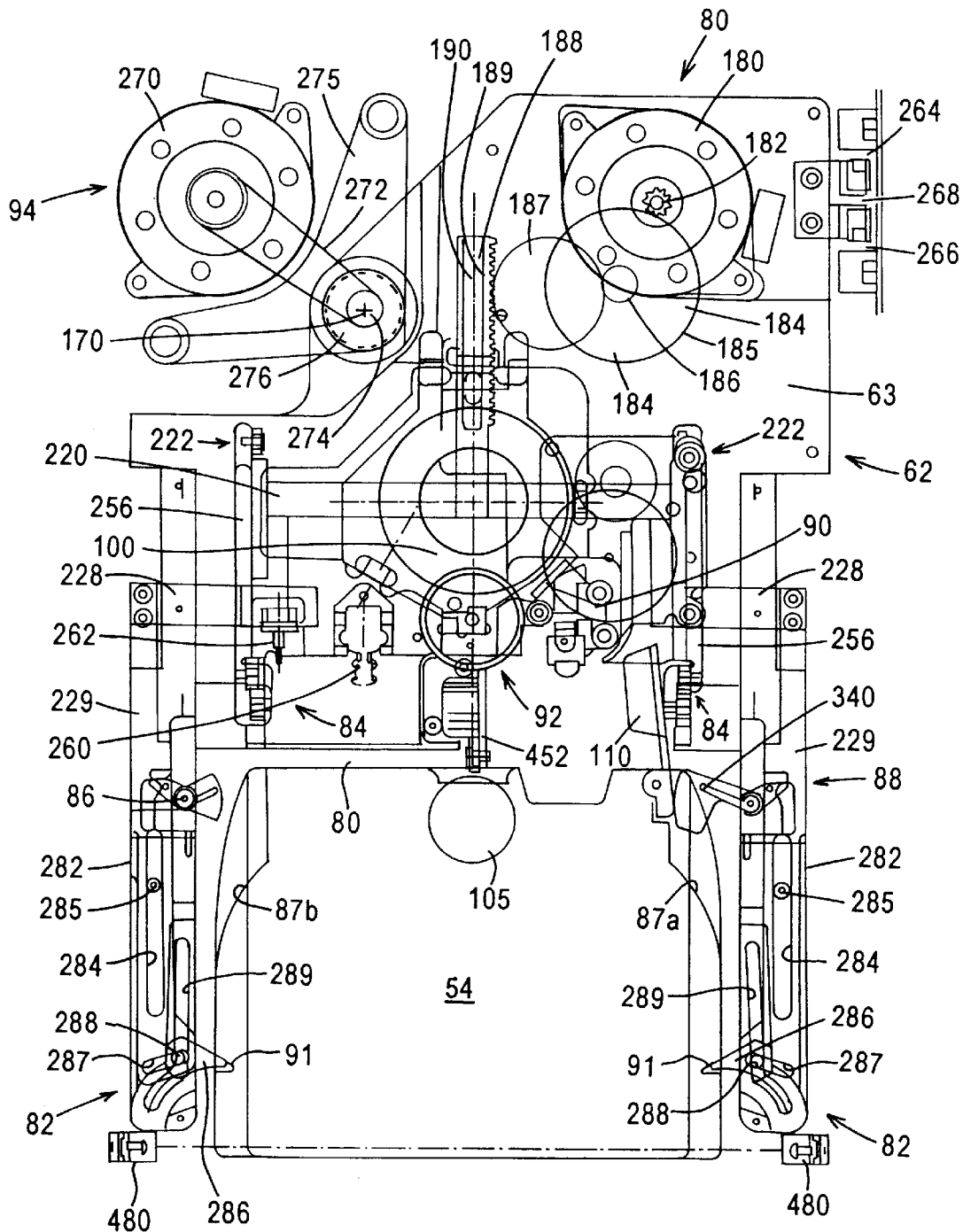
Figure 8D:
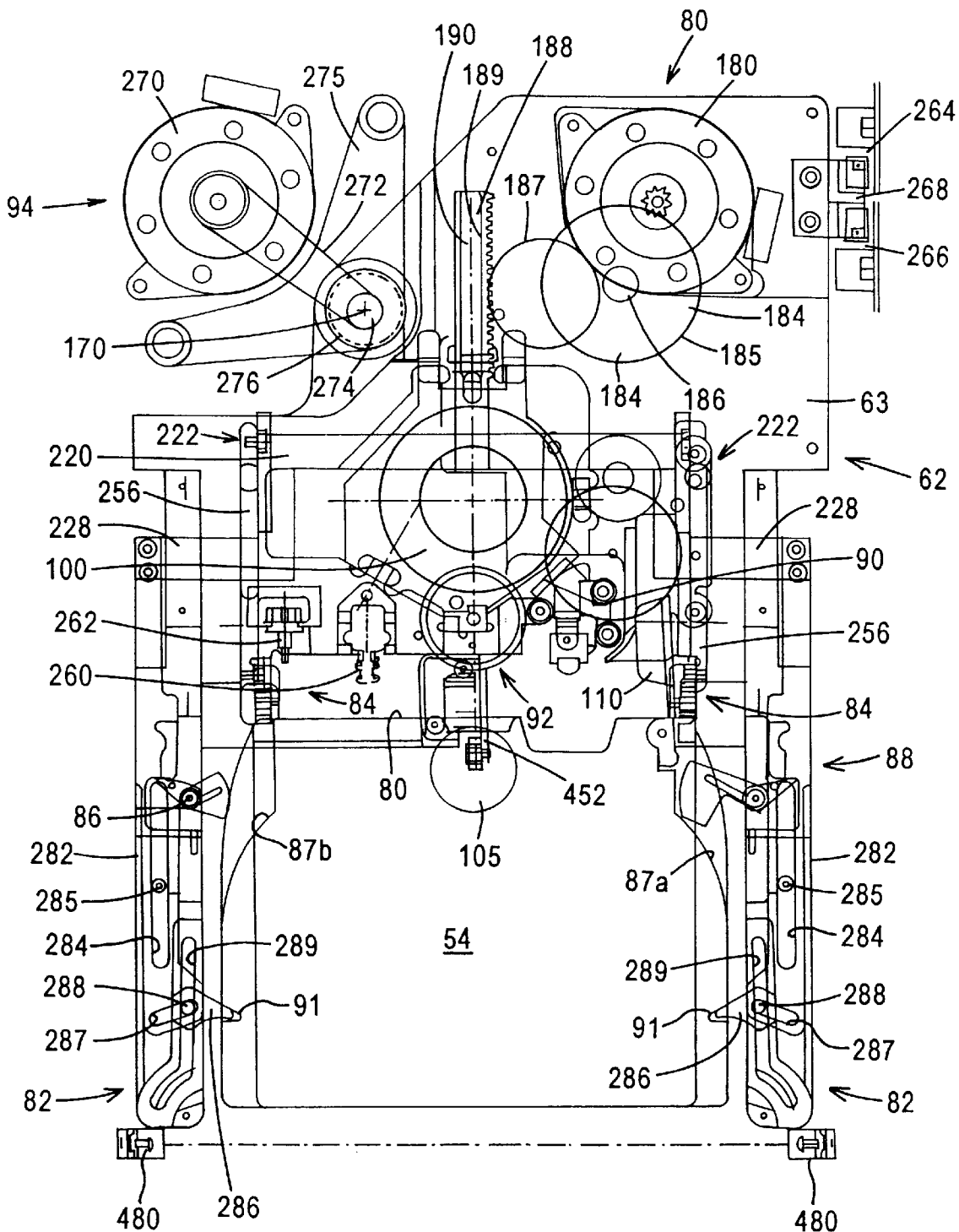
Figure 8E:
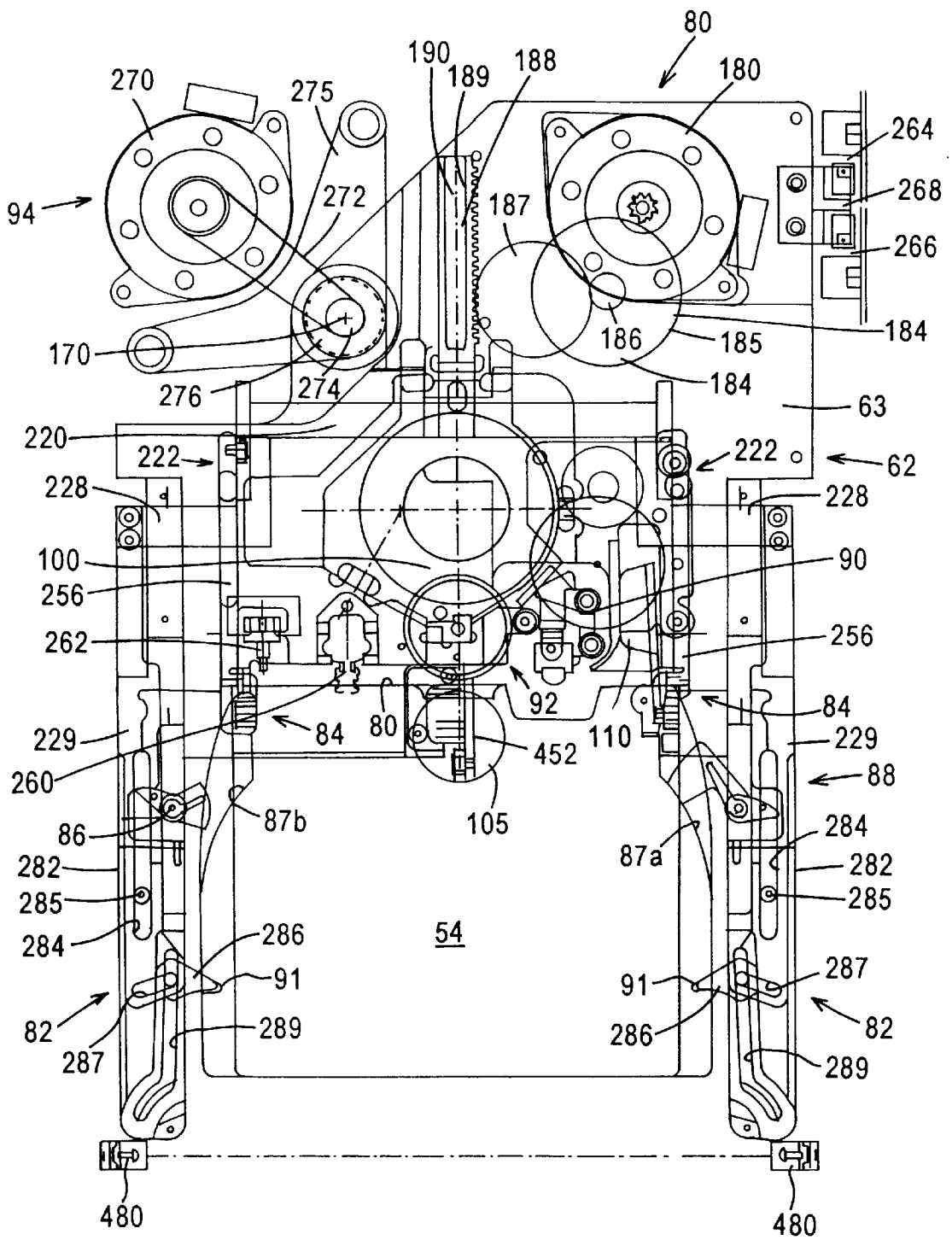
Figure 8F:
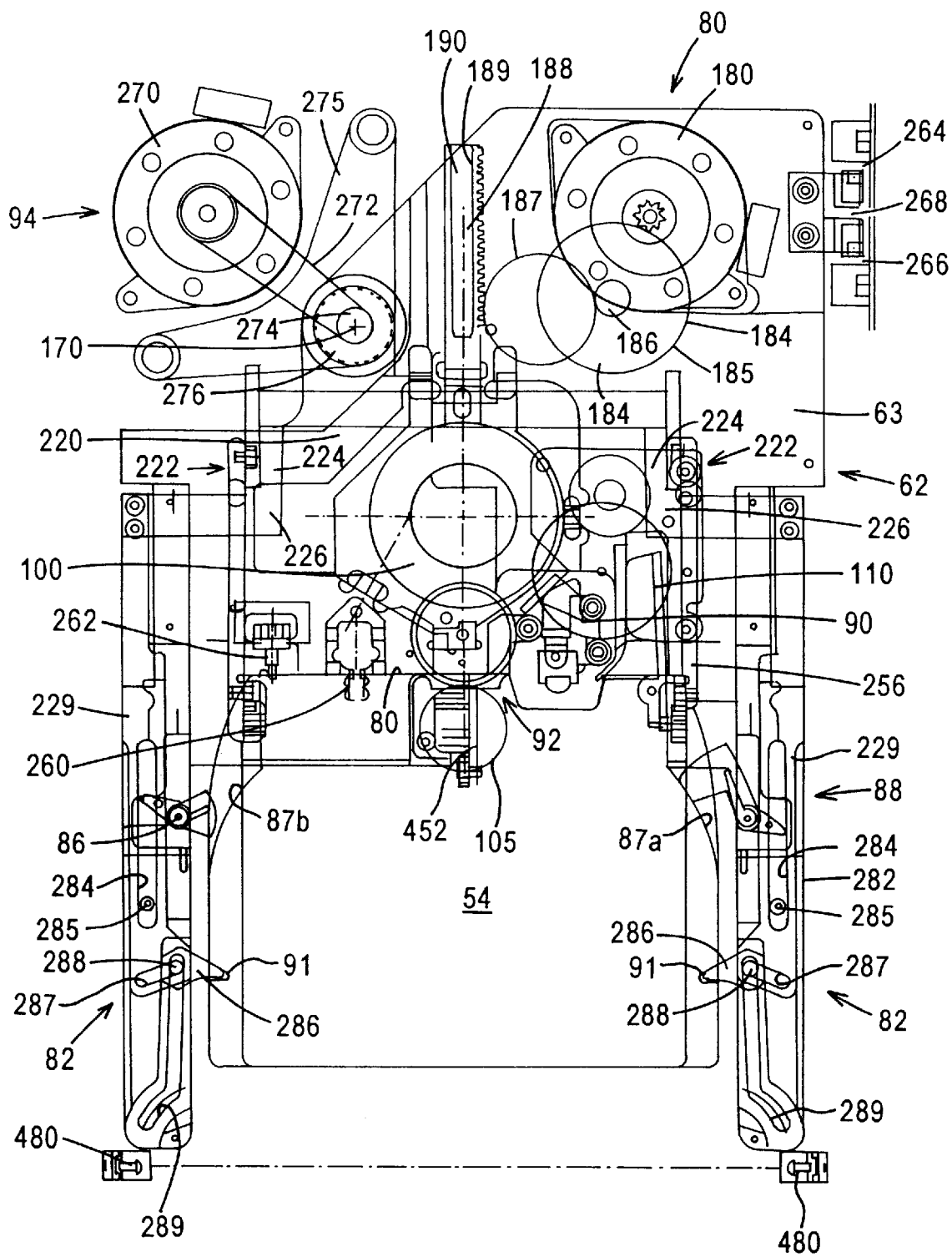
FIG. 8f is a top plan view of the tape autoloader mechanism of FIG. 1 depicting the tape autoloader mechanism in the fully engaged position.

The motor driven mechanisms for loading a tape cartridge 54 are schematically shown in top plan view in FIGS. 8a–8f. Referring first to FIG. 8a, drive motor assembly 80 includes stepper drive motor 180 mounted above drive plate 63. Drive motor assembly 80 includes a pinion gear 182 which extends vertically downwardly therefrom through drive plate 63 and meshes with spur gear 184 mounted forwardly and inwardly therefrom. Spur gear 184 includes a smaller diameter gear 186 extending upwardly from, but not through drive plate 63. Gear 184 and 186 are conventionally bushed with drive plate 63. Mounted below drive plate 63 and bushed to drive plate 63 is spur gear 187 which is mounted forwardly and inwardly and meshes with 186. Spur gear 187 meshes with a straight rack 188 mounted below drive plate 63 and having gear teeth on the right side thereof as depicted in FIG. 8a. As depicted in FIG. 8a rack 188 is depicted in a forwardmost position. In FIG. 8f, rack 188 is depicted in a rearwardmost position. Rack 188 extends in a longitudinal direction of housing assembly 60 and has elongated slot 189 with a guide bar 190 therein.

Picker mechanism 82 includes previously described rack 188. Connected to longitudinally extending elongate rack 188 is a transverse rectangular cross bar 220 which is rigidly attached to the rack 188 at the midpoint of cross bar 220.

Cross bar 220 terminates on opposite ends short of clamp arm assemblies 222 to be described in detail below. Extending forwardly from opposite ends of cross bar 220 are rectangular forwardly extending rectangular members 224. Extending transversely outwardly at distal ends of rectangular members 224 are a pair of elongate picker puller cam members 228. As depicted in FIG. 8a, cross bar 220, picker puller cam members 228 and picker mechanism 82 are shown in a forwardmost retracted position. As depicted in FIGS. 8b–8e, cross bar 220, picker puller cam members 228 and picker mechanism 82 are shown in intermediate positions. As depicted in FIG. 8f cross bar 220, picker puller cam members 228 and picker mechanism 82 are shown in a fully engaged rearward position. Cross bar 220, forwardly extending members 224 and picker puller cam members 228 form a rigid assembly and are driven in synchronized alignment to prevent binding and jamming of the mechanisms in which the tape cartridge 54 would be engaged with the read/write head 90. Picker puller cam members 228 are attached at distal ends to picker pullers 229 as described in detail below.

Approximately three rotations of drive motor 180 in the clockwise direction, as depicted in FIGS. 8a–8f, will move cross bar 220 from the fully engaged rearward position to the fully retracted forward position. Likewise, approximately three counterclockwise rotations of drive motor 180 will move cross bar 220 from the fully retracted forward position to the fully engaged rearward position.

Clamping mechanism 84 includes a pair of clamp arms 256 which extends in a longitudinal direction and have a transverse pin (not shown) extending through a hole in drive plate 63. Clamp arms 256 extend in a longitudinal direction. Clamp arms 256 extend above picker puller cam members 228.

Elevator assembly 94 includes a stepper motor 270 which drives a belt 272. A pulley 274 rotates about threaded shaft 170. A nut 276 fixed to drive assembly 62 serves to raise or lower drive plate assembly 62 to one of four vertical positions. A mounting plate 275 secures threaded shaft 170 to the bottom wall of housing assembly 60. The elevation of drive plate assembly 62 can be determined by counting the number of steps of stepper motor 270.

A two button switch 262 is used to determine a) if a cartridge 54 is loaded in the drive mechanism and b) write protect tab position. An optical sensor 260 is used to determine beginning and/or end of tape. Upper and lower sensors 264, 266 are located within housing assembly 60 near the top and bottom thereof and act as safety devices to stop motor 270 from forcing drive plate 63 too far in either an upward or downward direction. A sensor tab 268 is attached to drive plate 63 and extends outwardly therefrom to be brought into contact with sensors 264, 266. A two button-switch 262 is mounted to drive plate 63 and has a position extending beyond drive plate 63 so that cartridge 54 can be brought into contact therewith to verify that cartridge 54 has been brought into the fully loaded position.

Referring to FIGS. 1 and 8, drive plate assembly 62 includes a pair of picker tracks 282 fixed to drive plate 63. Picker tracks 282 extend longitudinally forwardly from drive plate 63 near the left and right side walls, respectively, of housing assembly 60 and serve to guide picker pullers 229. Picker tracks 282 are mounted outwardly such that picker tracks 282 do not interfere with magazine assembly 50 when it is installed within housing assembly 60. Slots 284 are defined in picker tracks 282 allowing picker pullers 229 to reciprocate relative to picker tracks 282. Guide pins 285 guide picker pullers 229 as picker pullers 229 reciprocate.

At a distal end of the picker pullers 229 are pickers 286 having a generally triangular shape. A vertical pin 288 extends through picker puller 229 and picker 286 so that the movement of the picker puller 229 causes movement of the picker 286. Pin 288 allows pickers 286 to rotate relative to picker pullers 229. Pin 288 also rides in slots 287 in picker puller 229 and in slot 289 and in picker track 282 as described in detail below.

Figure 9A:
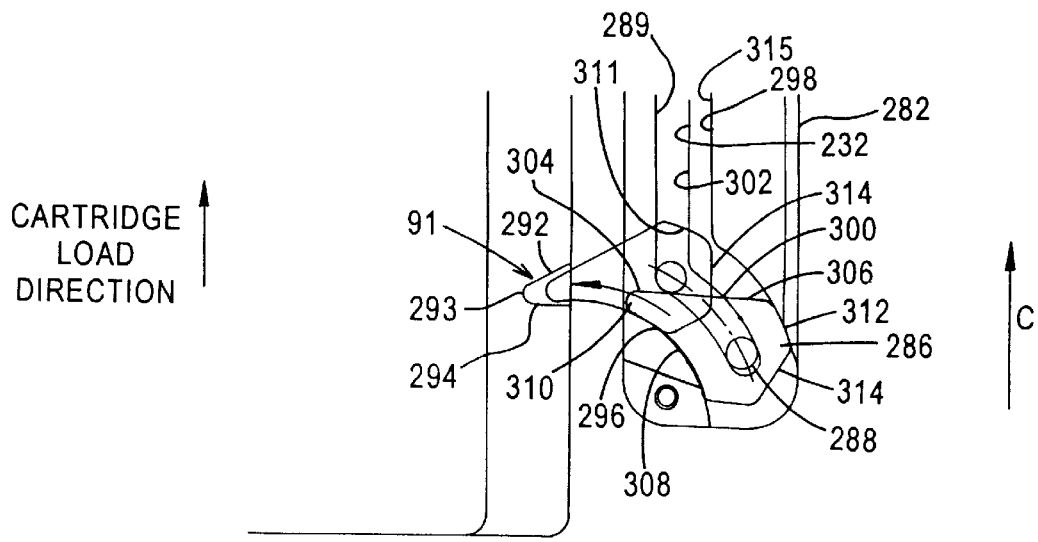
FIG. 9a is an enlarged partial top plan view of a picker in a first retracted position and a second partially engaged position.

FIG. 9a depicts the movement of a single picker 286 which engages the cartridge 54 to move the cartridge from within the magazine assembly 50 into a read/write position in engagement with the tape drive head assembly 90. For the sake of simplicity, the motion of only a single picker 286 will be described herein, but it is to be understood that both pickers 286 should operate nearly simultaneously and have the same motions.

Each Travan cartridge 54 has generally triangularly shaped notches 91 (FIGS. 3 and 9a) located on opposite sides thereof and towards the rear end of the tape cartridge. Each notch 91 has a forwardly angled surface 292 and a rear flat surface 294 joined by a rounded arcuate surface 293. Picker 286 is mounted in a first retracted position within a curved picker track 296 formed in picker track 282. Curved picker track 296 extends in a circular segmented arc from the distal end of picker track 282. The width of curved picker track 296 is slightly greater than the width of picker 286. A straight picker track 298 extends from the termination of curved picker track 296 in a rearward direction. Slot 289 includes a curved slot 300 and a straight slot 302. Pin 288 rides first in curved slot 300 corresponding and located in the center of curved picker track 296 and then rides in straight slot 302 which is centrally located within straight picker track 298.

Before a magazine assembly 50 is loaded into housing assembly 60 pickers 286 must first be moved into the first retracted position so that pickers 286 do not interfere with the entry of magazine assembly 50. Also, before the drive plate assembly 62 is moved vertically, pickers 286 must be moved into the first retracted position so that the pickers 286 do not interfere with the movement of magazine assembly 50. In the first position depicted in FIGS. 9a and 8a, a nose 304 of picker 286 is substantially within picker track 282. As picker 286 moves from the first position to a second position nose 304 enters within notch 91. A slot 287 (FIGS. 8a–8f) in picker puller 229 allows pin 288 to translate relative to picker track 282. Slot 287 extends inwardly and rearwardly from the front corners of tape autoloader 40. The movement of pickers 286 is caused by picker pullers 229 and pin 288 as guided by curved slot 300 and straight slot 302. The second position is the position where pin 288 has reached the end of curved slot 302. Picker 286 has a flat surface 306 and a curved surface 308 which are joined together at the apex by a rounded surface 310 at the nose 304. Picker 286 is moved by picker pullers 229 engaged with pin 288 such that pin 288 follows curved slot 300 and nose 304 enters within notch 91. It should be noted that picker 286 is moving in a generally transverse direction as it enters notch 91. Picker 286 has a curved surface 310 having at least approximately the same radius of curvature as surface 312 and a straight surface 314 adjacent thereto. At this second position there is a slight horizontal gap between angled surface 292 of notch 91 and flat surface 306 of picker 286. In this second position, pickers 286 have not yet started to move tape cartridge 54 rearwardly toward the tape head drive assembly 90.

Figure 9B:
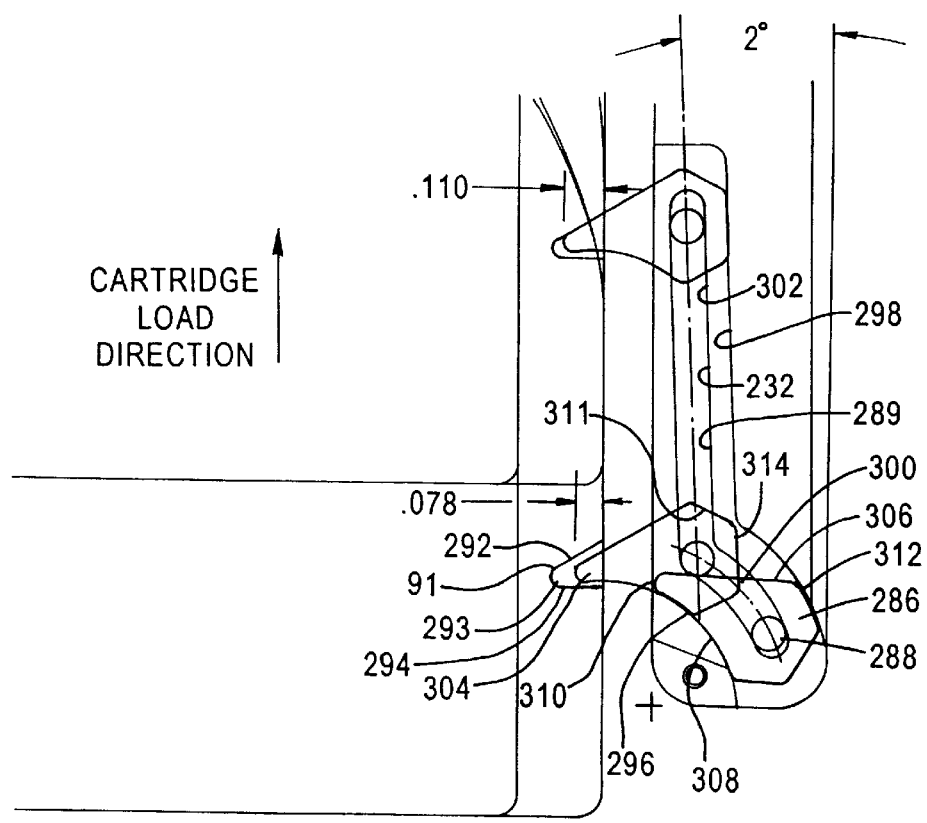
FIG. 9b depicts the movement of the picker from a first retracted position to a second partially engaged position and then to a third fully engaged position.

Straight picker track 298 and straight slot 302 extend inwardly and rearwardly at approximately a 2 degree angle relative to the longitudinal direction as depicted in FIG. 9b. A wall 315 of straight slot 302 prevents rotation of picker 286 as surface 314 is brought adjacent thereto as picker 286 is moved rearwardly. This 2 degree angle enables picker 286 to be brought into further engagement with notch 91 as picker 286 is moved rearwardly. As depicted in FIG. 9b, nose 304 extends within notch 91 approximately 0.078 inches in the second position and as picker 286 moves from the second position into a third position the depth of engagement increases to approximately 0.110 inches. As described previously, approximately three rotations of motor 270 causes picker puller 229 to move from the fully retracted forward position corresponding to the first position of picker 286, to the fully engaged rearward position corresponding to the third position of picker 286. At the end of the approximately three rotations motor 270 is stopped. Pickers 286 will remain in this third position until such time as the tape cartridge 54 is finished with its read/write operation and the movement of the pickers 286 is reversed.

Figure 10A:
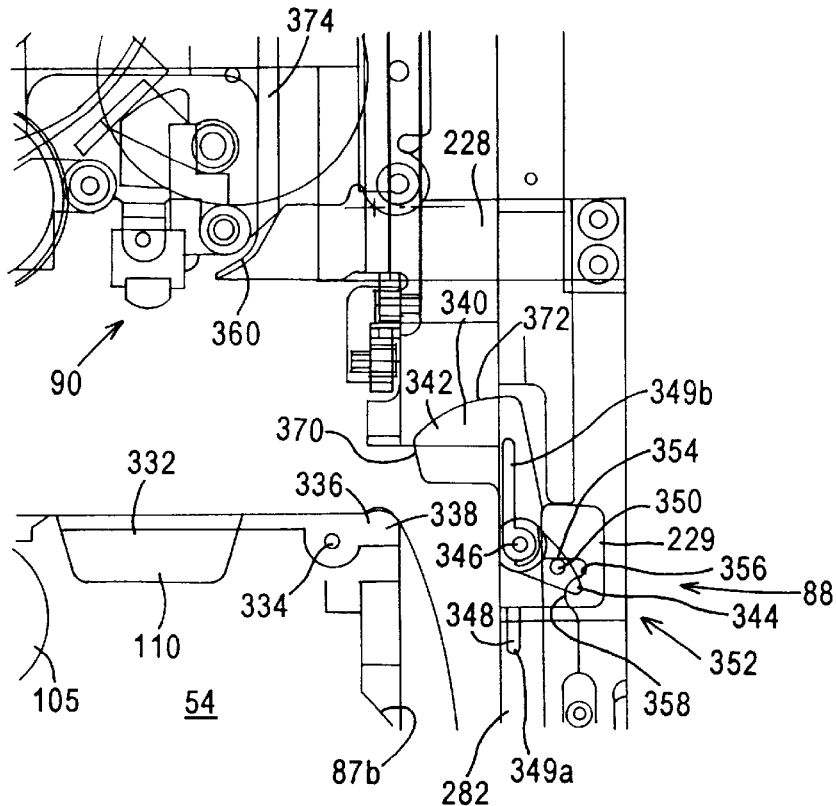
FIG. 10a is an enlarged top partial plan view of the door opening mechanism of FIGS. 8a–8f depicting the tape cartridge door in a closed position and the tape door opening mechanism in a retracted position.

In FIG. 10a an enlarged partial plan view of a front end of tape cartridge 54 is depicted adjacent door opening mechanism 88. As depicted in FIG. 10*a*, cartridge door 110 is in a closed position. It is preferable that each of the tape cartridge dust cover doors 110 remain closed when the tape is not in use to prevent dust and debris from entering the tape cartridge. To achieve this, each tape cartridge door 110 is only opened as the tape cartridge 54 is being brought into engagement with tape head 90. As depicted in FIG. 10*a* tape cartridge 54 is in a position loaded in the magazine assembly 50 and door 110 is closed.

Figure 10B:
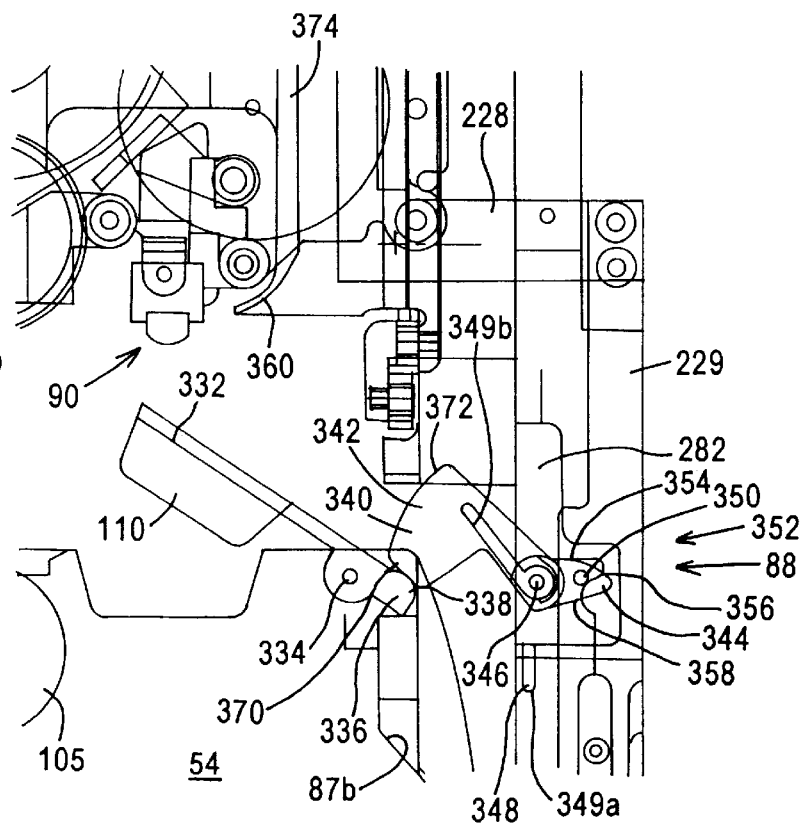
FIGS. 10b–10d are enlarged top partial plan views depicting the door opening mechanism of FIGS. 8a–8f moving a partially opened cassette cartridge door to intermediate positions.
Figure 10C:
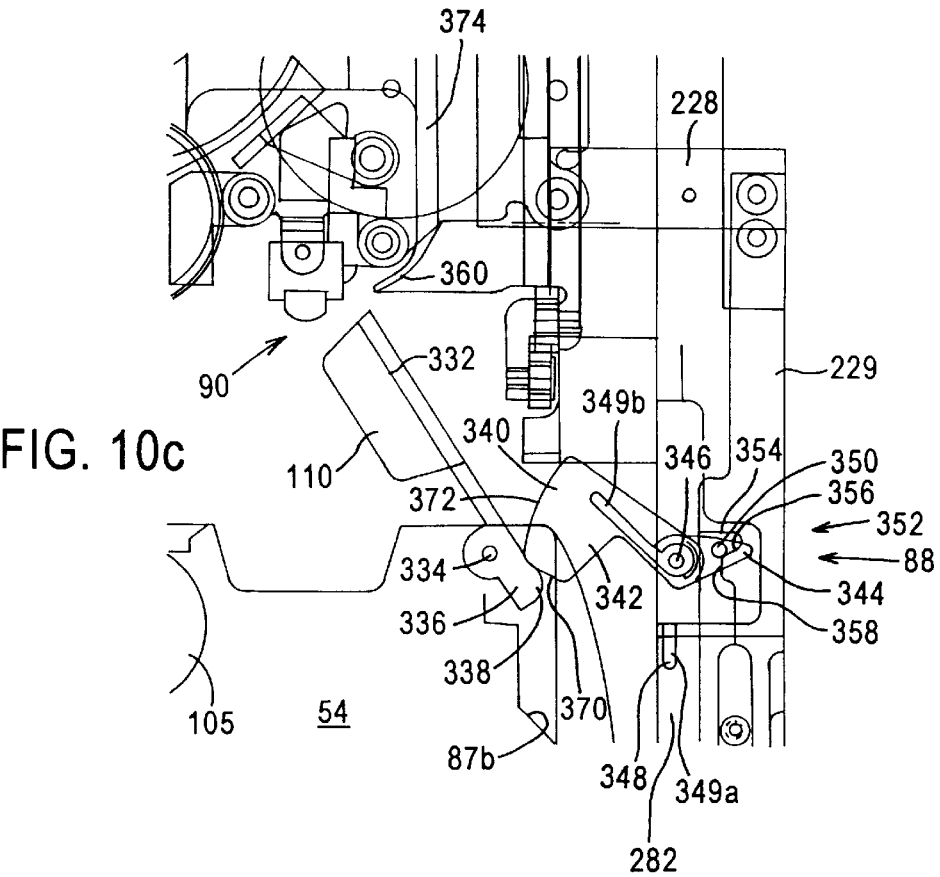
Figure 10D:
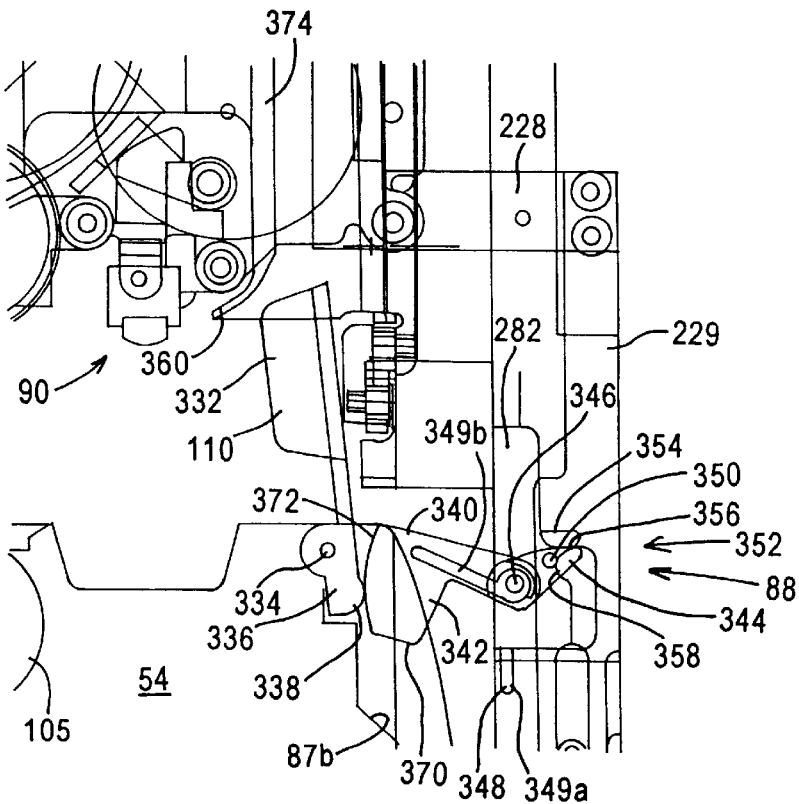
Figure 10E:
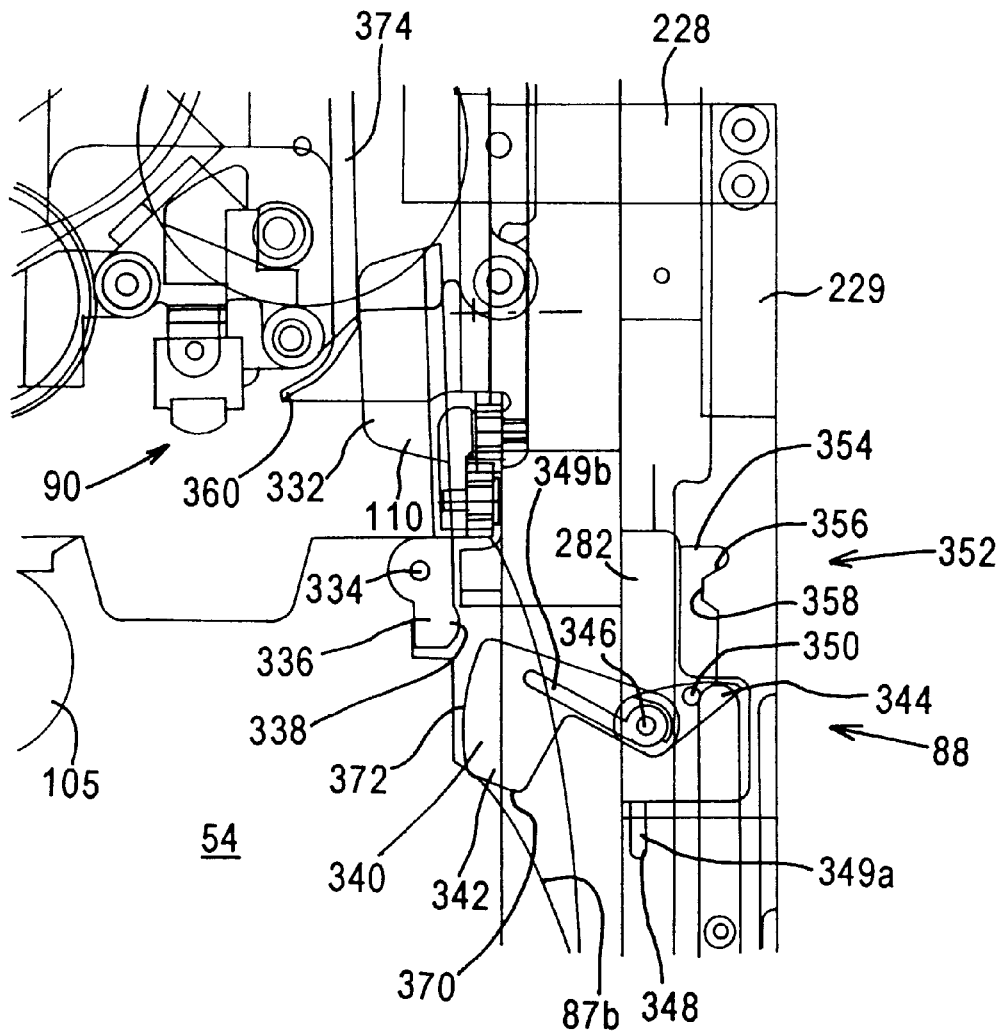
FIG. 10e is an enlarged top partial plan view depicting the movement of the cartridge door from a partially open position to a fully open position.

Cartridge door 110 of tape cartridge 54 has a dust cover portion 332 pivotably mounted by a pivot pin 334 to tape cartridge 54 and has an extending portion 336 which extends in a transverse direction towards the right picker puller 229 as depicted in FIG. 10*a*. Extending portion includes a bump portion 338 at a distal end thereof and extending rearwardly relative to tape autoloader 40 as depicted in FIG. 10*a*. Cartridge door 110 is biased into the closed position by a torsion spring (not shown). Door opening mechanism 88 is mounted to picker track 282 outwardly from door 110. Door opening mechanism 88 includes a door opening member 340 having an enlarged head portion 342 which extends inwardly beyond picker track 282 and a tail portion 344 which extends at an angle outwardly and forwardly as depicted in FIG. 10*a*. Door opening member 340 is pivotably mounted to picker track 282 by a pivot pin 346 and a torsion spring 348 biases head portion 342 in a counterclockwise direction towards tape cartridge 54 as depicted in FIG. 10*a*. One leg 349*a* of torsion spring 348 is stationary against picker track 282 and the other leg 349*b* is engaged with head portion 342. Door opening member 340 is pivotable between an initial position FIG. 10*a* and a fully open position (FIG. 10*e*).

A pin 350 extends vertically from tail portion 344 of door opening member 340. Picker puller 229 includes a cam section 352 vertically spaced from tail portion 344. Cam section 352 includes a transversely extending flat portion 354, a rear cam surface 356 and a flat portion 358. A curved door guiding member 360 is mounted to drive plate 63 and is adjacent to head assembly 90. Head portion 342 of door opening member 340 has a flat cam surface 370 which is brought into camming engagement with bump portion 338 of cartridge door 110 as picker puller 229 is moved rearwardly.

Flat cam surface 370 becomes a curved cam surface 372 at a rear point thereof. As depicted in FIG. 10*a*, pin 350 is abutting transversely extending flat portion 352 thereby maintaining door opening member 340 in the initial position against the bias of torsion spring 348. As picker puller 229 is moved rearwardly, moving flat portion 352 rearwardly so that the bias of torsion spring 348 causes head portion 342 and tail portion 344 to rotate in a counterclockwise direction. As door opening member 340 rotates, flat portion 370 engages bump portion 338 causing cartridge door 110 to partially open. Concurrently, rear cam surface 356 engages pin 350. This engagement permits the force exerted by picker puller 229 and torsion spring 348 to be combined to overcome the force exerted by torsion spring 338 (not shown) ensuring that cartridge door 110 will be opened. Rear cam surface 356 is shaped in manner that cooperates with bump portion 338 and flat portion 370 and curved portion 372 so that cartridge door 110 is opened enough to avoid cartridge door 110 from contacting head assembly 90 as depicted in FIGS. 10*b*–10*d*. As picker puller 229 continues to move rearwardly, pin 350 rides on flat portion 358 and bump portion 338 rides on curved portion 372 as depicted in FIG. 10*d*. As picker puller 229 continues to move rearwardly, pin 350 rides on flat portion 358 and bump portion 338 rides on curved portion 372 as depicted in FIG. 10D. Dust cover portion 332 is now prevented from striking head assembly 90 by door guiding member 360. As depicted in FIG. 10E, continued rearward movement of tape cartridge 54 causes dust cover portion 332 to engage a longitudinally extending portion 374 of door guiding member 360 preventing clockwise rotation of door opening member 340.

An alternative arrangement (not shown) provides for four door opening members 340 to remain fixed in the engaged position so that all cartridge doors 110 are automatically opened when the magazine assembly 50 is inserted into housing assembly 60.

Figure 11A:
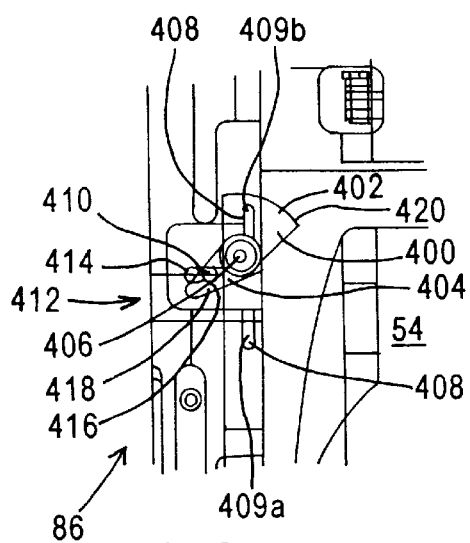
FIG. 11a is an enlarged top partial plan view of the cartridge release mechanism of FIGS. 8a–8f, with cartridge locking arm omitted for clarity, depicting the cartridge release mechanism in a retracted position.
Figure 11D:
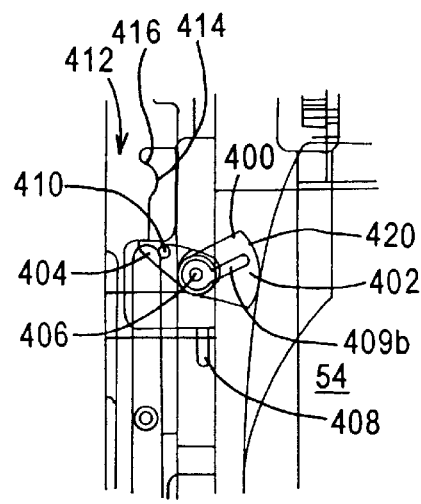
FIGS. 11b–11f are enlarged top partial plan views of the cartridge release mechanism of FIG. 8 depicting the cartridge release mechanism rotating into engagement with the tape cartridge.
Figure 11B:
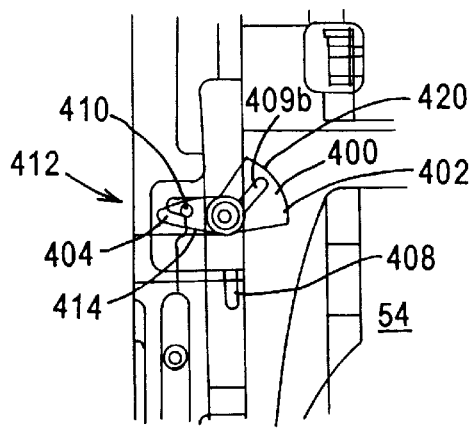
Figure 11E:
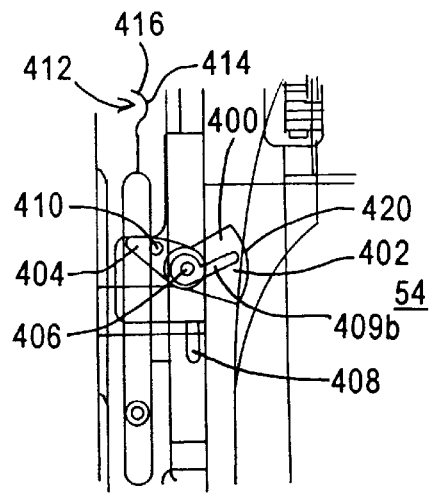
Figure 11C:
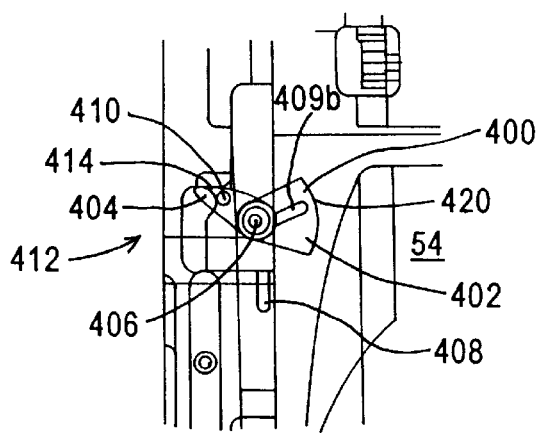
Figure 11F:
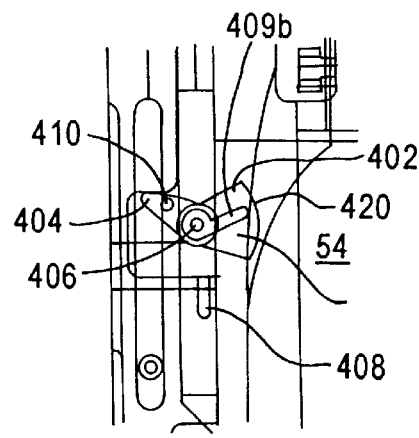

Referring back to FIGS. 4, 8*a*–8*f* and to FIGS. 11*a*–11*f*, the cartridge release mechanism 86 will be explained in detail. Cartridge release mechanism 86 is mounted to picker track 282 outwardly from tape cartridge 54. Cartridge release mechanism 86 includes cartridge release member 400 having an enlarged head portion 402 which extends inwardly beyond picker track 282 and a tail portion 404 which is extends at an angle outwardly and forwardly as depicted in FIG. 11*a*. Cartridge release member 400 is pivotably mounted to picker track 282 by a pivot pin 406 and a torsion spring 408 biases head portion 402 in a clockwise direction towards L-shaped locking arm 132 as depicted in FIG. 8*a*. Cartridge release member 400 is pivotable between an initial position (FIG. 11*a*) and a fully open position (FIG. 11*f*). One leg 409*a* of torsion spring 408 is stationary against picker track 229 and the other leg 409*b* is engaged with head portion 402.

A pin 410 extends vertically from tail portion 404 of cartridge release member 400. Picker puller 229 includes a cam section 412 vertically spaced from tail portion 404. Cam section 412 includes a transversely extending flat portion 414, a rear cam surface 416 and a flat portion 418. Cartridge release member 400 has at a distal end of head portion 402 a curved surface 420 for engagement with releasing portion 136.

As depicted in FIG. 11*a*, pin 410 is abutting transversely extending flat portion 414 thereby maintaining a cartridge release member in the initial position against the bias of torsion spring 408. As picker puller 229 is moved rearwardly, flat portion 414 is moved rearwardly so that the bias of torsion spring 408 causes head portion 402 and tail portion 404 to rotate in a clockwise direction. As cartridge release member 400 rotates, curved surface 420 engages release portion 136 causing engagement portion 134 to move downwardly. Concurrently, rear cam surface 416 engages pin 410. This engagement permits the force exerted by picker puller 229 and torsion spring 408 to be combined to overcome the force exerted by the torsion spring (not shown) of cartridge locking arm 132 insuring that tape cartridge 54 will be allowed to move forwardly.

Figure 12A:
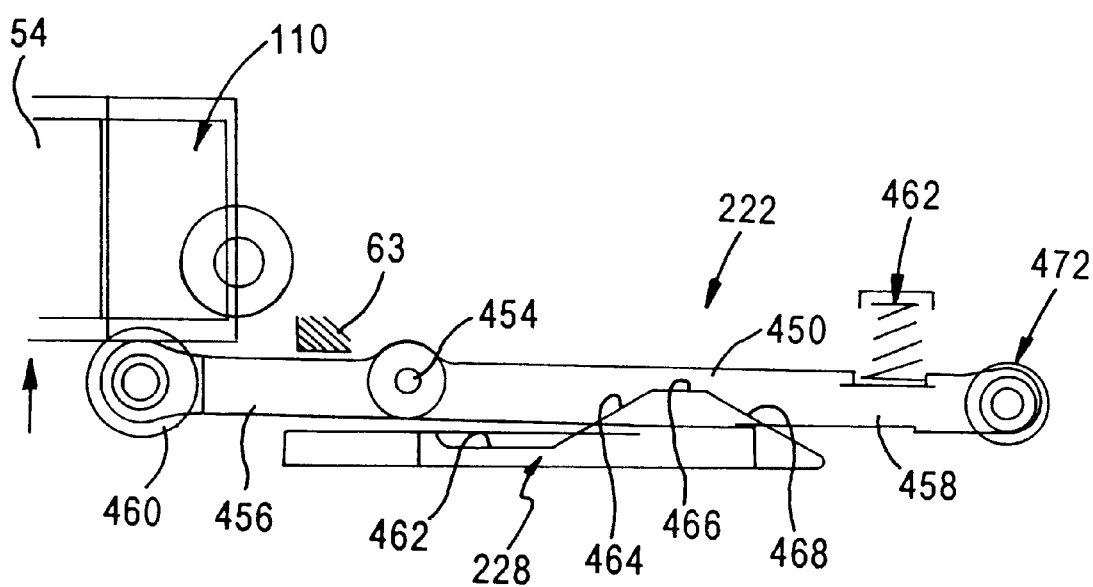
FIG. 12a is a partial side elevational view depicting a clamp arm and the picker puller cross arm in an initial position.

Clamp mechanism 84 is depicted in FIGS. 8*a*–8*f* and 12*a*–12*f*. Clamp arm assemblies 222 are connected to drive plate assembly 62 through pins extending through pivot holes 454 as depicted in FIG. 12. As depicted in FIG. 12*a*, clamping mechanism 84 includes a pair of pivotable clamp arms 450 extending in the longitudinal direction and a fixed clamp arm 452 (FIG. 8*a*). Clamp arms 450 have a forward portion 456 on one side of pivot holes 454 and a horizontally offset rearwardly extending portion 458 on the other side of pivot holes 454. Picker puller cam members 228 are located underneath of rearwardly extending portion 458. At the forwardmost end of forward portion 456 is a radial bearing 460. Clamp arm 450 is an elongate member and pivots about pivot hole 454. Rear portion 458 is downwardly biased by a spring 462 having one end in contact with a lower surface of drive plate 63 (not shown) and the other end in contact with an upper surface of rear portion 458 as depicted in FIGS. 12a–12g.

As depicted in FIGS. 12a–12g, clamp arm 450 remains fixed at pivot 454 relative to drive plate 63. The movement of picker puller cam member 228 underneath rear portion 458 causes the pivoting of clamp arm 450 about pivot 454. As depicted in FIG. 12a, picker puller cam member 228 has a cam section 460 including a forward depressed surface 462 adjacent to a forward inclined cam surface 464, a horizontally extending flat surface 466 and a rearwardly incline cam surface 468. As depicted in FIG. 11a, a clamp roller 470 located at the distal end of forward portion 456 and lifter roller 472 located at the distal end of rear portion 458 are in a non-pivoted centrally horizontal position.

Figure 12B:
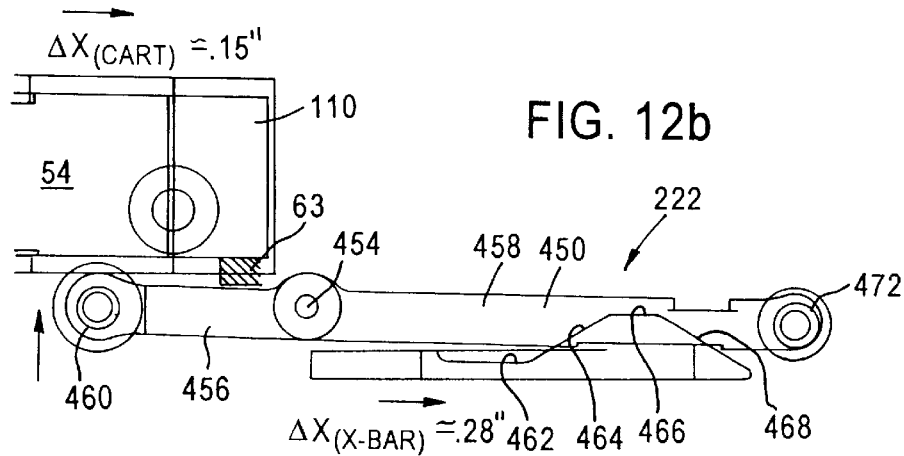
FIG. 12b is a partial side elevational view depicting a clamp aim and the picker puller cross arm in an intermediate position with the tape cartridge having been pulled towards the tape head.

Picker puller cam member 228 is depicted in an initial position in FIG. 12a. In FIG. 12b picker puller cam member 228 is depicted in an intermediate position where cartridge door 110 is partially open.

Figure 12C:
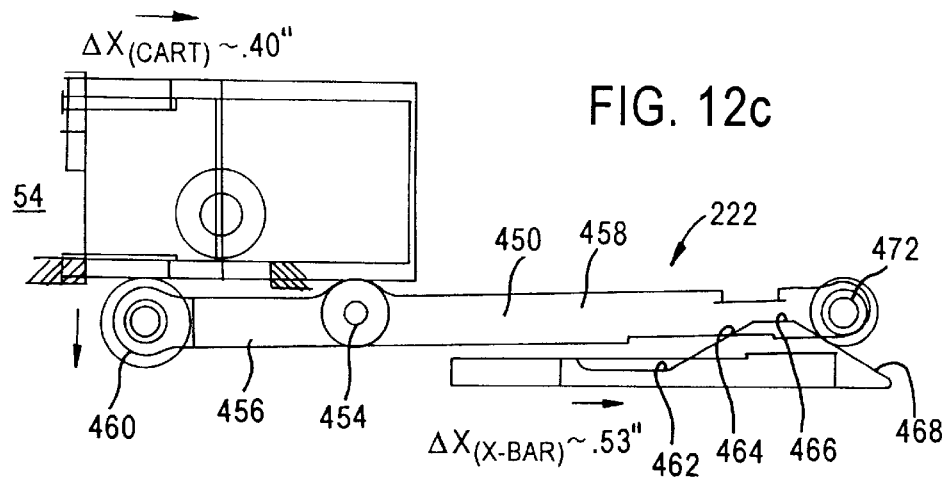
FIG. 12c is a partial side elevational view depicting a clamp arm and a cam surface of the picker puller cross arm in contact with a lifter roller.
Figure 12D:
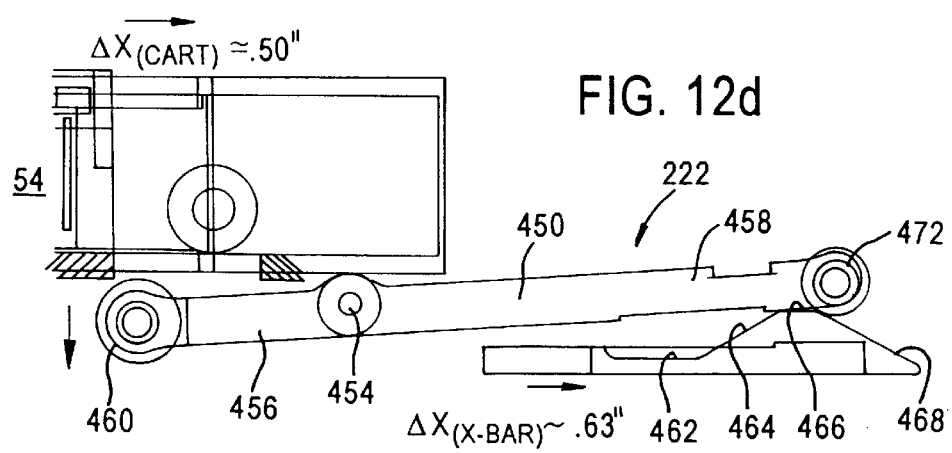
FIG. 12d is a partial side elevational view depicting a clamp arm and the lifter roller beginning to engage a flat cam surface of the cross arm of the picker puller.
Figure 12E:
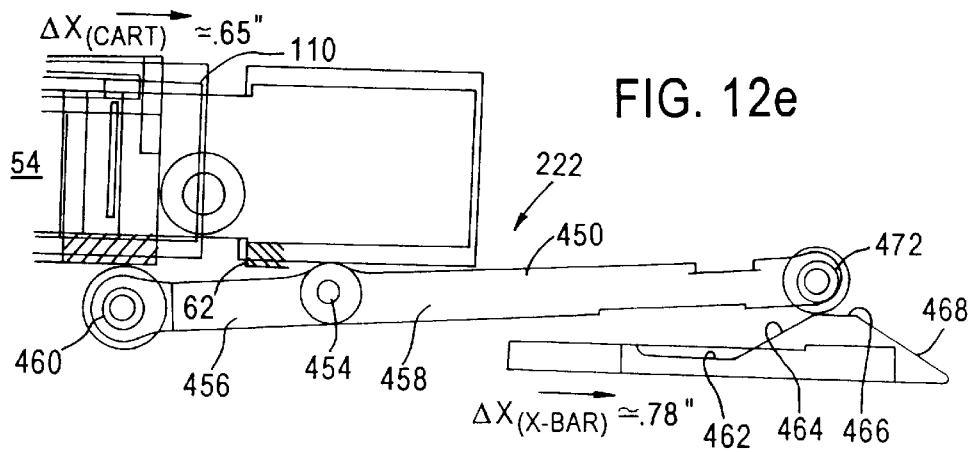
FIG. 12e is a partial elevational side view depicting a clamp roller engaging a bottom surface of the tape cartridge.

As depicted in FIG. 12c, rearwardly inclined cam surface 468 contacts lifter roller 464. As depicted in FIG. 12d, further rearward movement of picker puller cam member 228 causes lifter roller 472 to rise on cam surface 468 overcoming spring bias 388 and causing clamp roller 470 to pivot downwardly. As depicted in FIG. 12e, further rearward movement of picker puller cam member 228 does not cause further pivoting of clamp roller 470 and lifter roller 472 rides on flat surface 466. Lifter roller 472 engages the bottom surface 310 of cartridge 54 while lifter roller 390 is on flat surface 404.

Figure 12F:
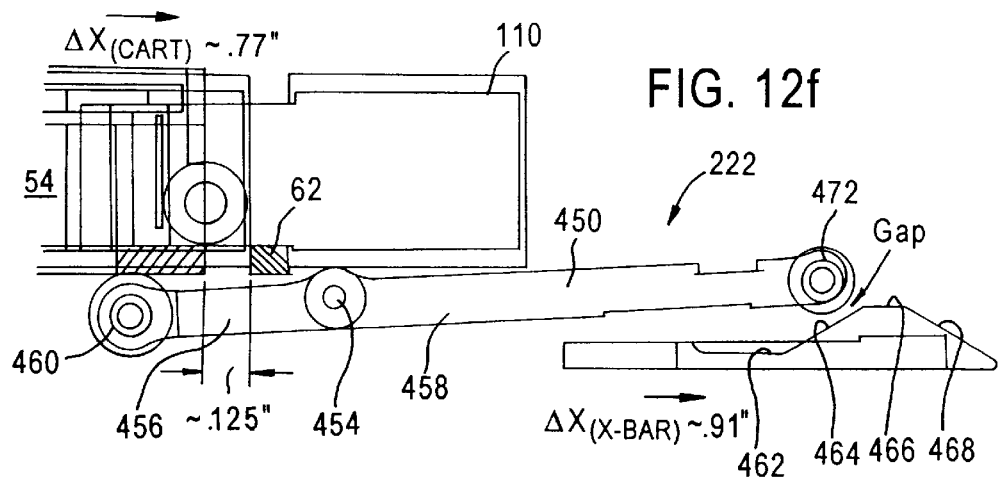
FIG. 12f is a partial elevational side view depicting a gap between the lifter roller and a cam surface of the picker puller.
Figure 12G:
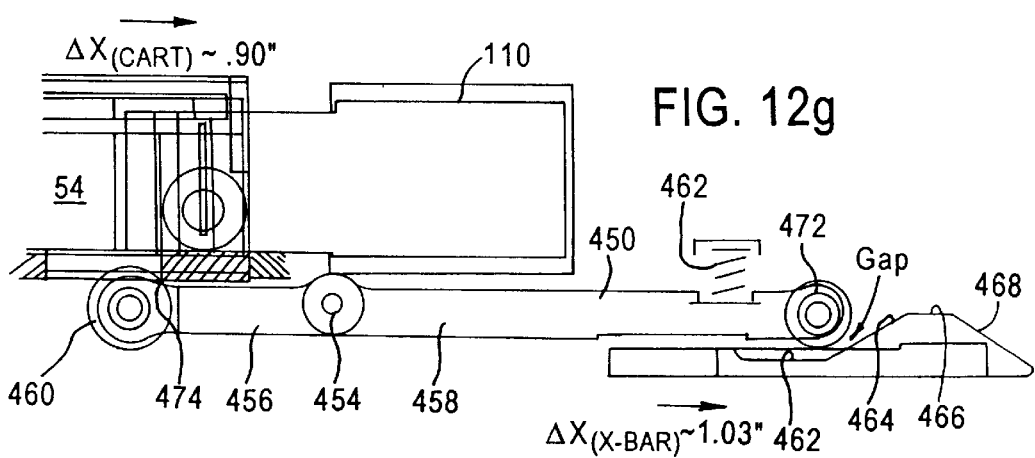
FIG. 12g is a partial elevational side view depicting the clamp roller fully engaged in a notch in the tape cartridge and the tape cartridge in a final fully engaged position with a read/write head.

As depicted in FIG. 12f, further rearward movement of picker puller cam member 228 results in a gap being formed between lifter roller 472 and surface 464 while clamp roller 470 remains in contact with surface 310 due to the bias of spring 459. When the tape cartridge 54 has been moved in to its final position, approximately 0.90 inches of rearward movement, clamp roller 470 is in contact with an edge 474 of notch 87b.

In summary, with reference to all of the Figures, rotation of motor 270 causes rearward movement of picker puller cross arms 228 and picker pullers 229 causing the cartridge release mechanism 86 to release the tape cartridge 54. Subsequently, pickers 286 enter notches 91. Further rearward movement of picker pullers 229 begins the camming of door opening member 340 fully opening door 110. Once picker puller cross arms 228 have moved approximately 0.28 inches rearwardly, cam 460 begins to pivot cross arm 450 until cartridge 54 is moved rearwardly such that clamp rollers 470 engage notches 98 and cartridge 54 is in the final position and the tape within cartridge 54 is properly positioned against the read/write head 90 and capstan drive pulley 104 is fully rotationally engaged with the capstan in tape cartridge 54.

Figure 13A:
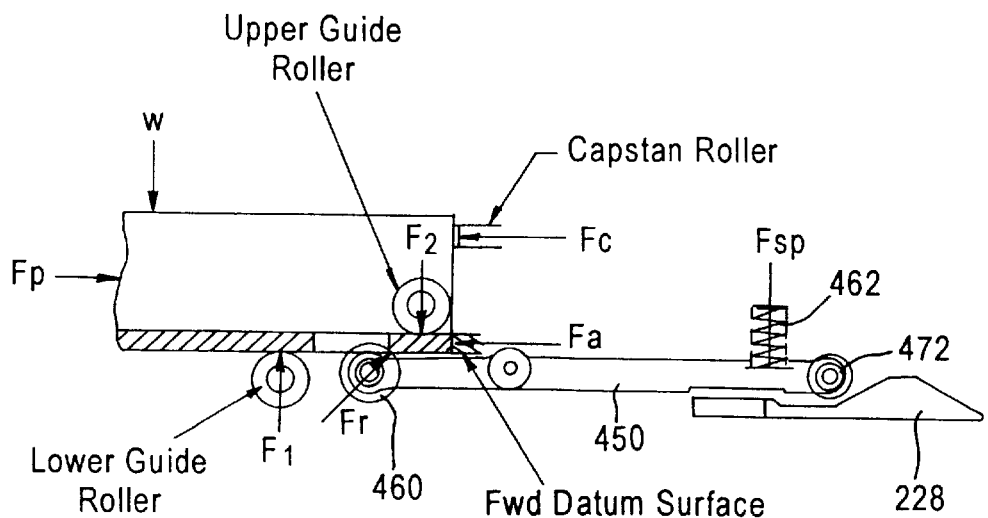
FIGS. 13a and 13b are schematic partial elevational side views of depicting the forces acting on the clamp arm of FIGS. 12a–12g.
Figure 13B:
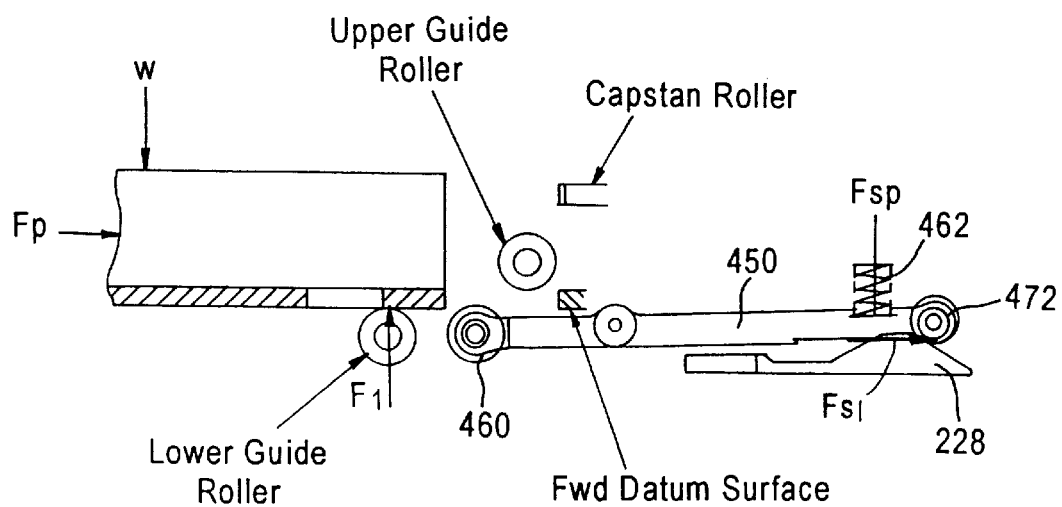

Force diagrams are depicted in FIGS. 13a and 13b. A force (Fr) reacting at the clamp roller 460 of approximately 2.12 lbs. is required to hold the cartridge 54 of equilibrium. A force of Fr=4.5 lbs. is applied via the clamp roller 460 provided by the spring force (Fsp) to maintain intimate contact against the datums and surfaces during vibration and shock disturbances. The force (Fr) applied is also enough to require zero additional force from motor 270 once the cartridge is moved into a fully engaged position. Therefore, during recording and idle periods in the fully engaged position, load motor 270 can be turned off, reducing the power requirements of the tape autoloader.

The force required at the pickers (Fp) is low during most of the loading sequence. The point during loading requiring most of the motor torque occurs while the rear roller 472 is climbing the ramp on the picker cross bar 228 (FIG. 13b). The horizontal force (Fsl) of approximately 1.2 lbs. accounts for most of the required picker force (Fp) of approximately 1.4 lbs. during the position shown in FIG. 13b.

To unload the cartridge from the fully engaged position requires counterclockwise (as viewed in FIG. 8) rotation of motor 270 to overcome the clamp rollers. At this instance, the ramp on picker cross bar 228 is not in contact (see FIG. 11g). The capstan roller does provide some help initially. Taking all reactions into account, a force of (Fp) of approximately 1.7 lbs. is required at the pickers 286 to start unloading cartridge 54. The gear training increases the load motor torque by a factor of greater than 6:1. Load motor 270 has a pull-out torque in excess of 0.5 in.-lbs. @ 100 steps/second capable of providing approximately 16 lbs. of force at the picker crossbar 228 at those speeds. Smooth operation requires higher motor speeds that will be applied once cartridge 54 movement has begun. Cartridge 54 is fully unloaded into the magazine via the pickers. Cartridge presence in the magazine is confirmed via cartridge sensor pair 480 (see FIGS. 8a–8f). Alternatively, picker position sensor can be used to verify that the picker puller is in the forwardmost position and, therefore, the picker is fully retracted inside the picker track (see FIG. 9a).

The drive plate can move up or down to any of the other three cartridge positions under the condition that the pickers 286 are in the fully retracted position. Drive plate 63 is raised or lowered via the elevator motor and lead screw located in the rear left corner of the drive. As viewed in FIG. 8, rotation of the elevator motor 270 raises the drive plate 62. The torque required to raise the drive plate 62 is less than 1.0 oz.-in. The torque available from the elevator motor 270, belt and pulleys, is over 8.0 oz.-in. Drive plate 63 location is positioned by step or motor counts and confirmed by sensors located at the picker tracks 229 looking at the magazine.

Figure 14A:
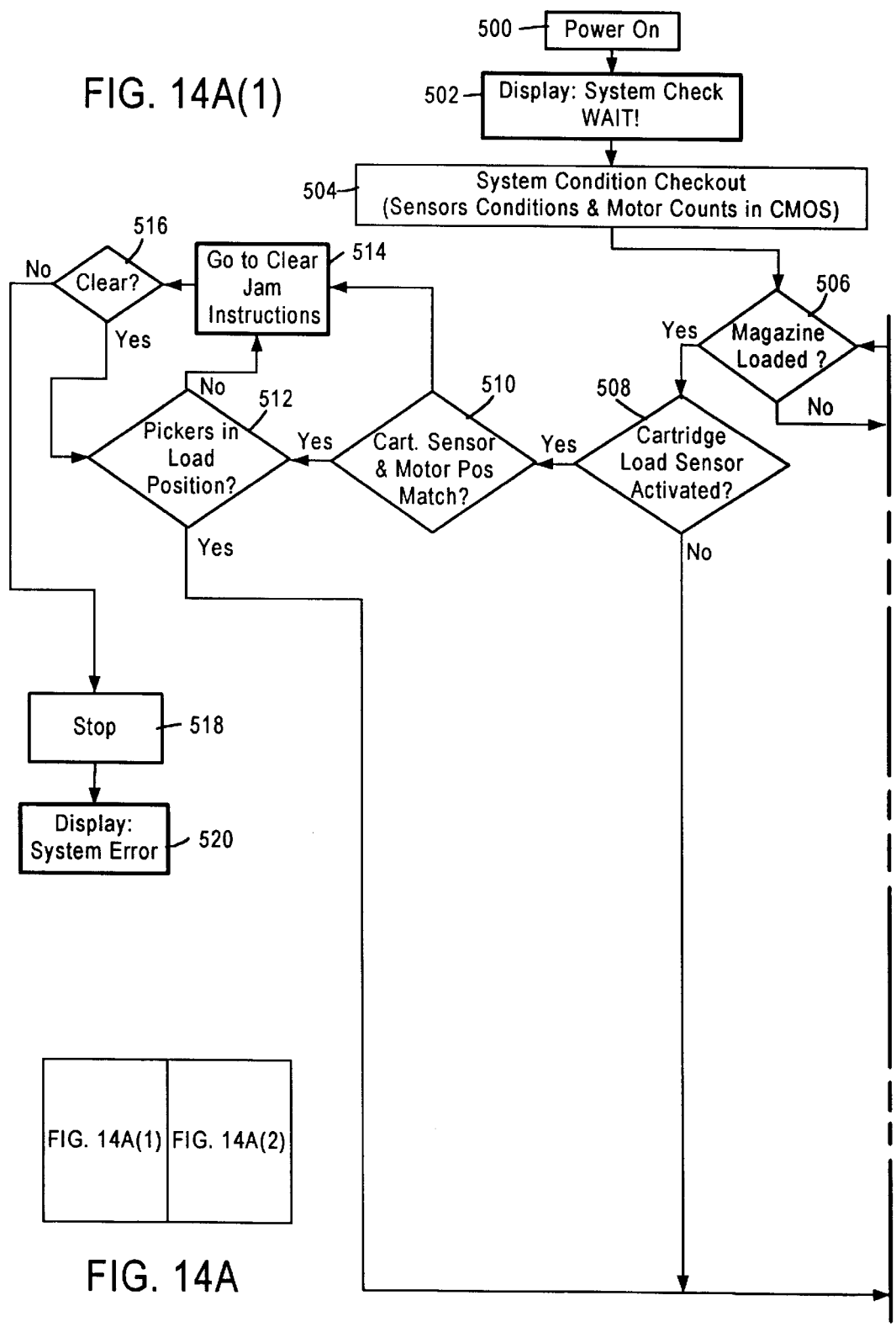

A flow chart comprising a flow diagram illustrating the control program executed by the loader control circuit is illustrated collectively in FIGS. 14a and 14b. At step 500, the power is turned on. In step 502, the system checks itself and displays a wait instruction to the operator. At step 504, the system conditions are checked out, including checking each of the sensors and putting the motor into a particular position. At step 506, tape autoloader 40 decides whether the magazine 52 is loaded. If the magazine 52 is loaded, then in step 508, it is determined whether the cartridge load sensors are activated. If the cartridge load sensors are activated, then in step 510, it is determined whether cartridge sensor and motor position match. If the cartridge sensor and motor position match, then in step 512 it is determined whether the pickers 286 are in the loaded position. If the cartridge sensor and motor position do not match, then in step 514, the autoloader goes to a clear jam instruction. At step 516, the autoloader is cleared. If the autoloader is successfully cleared, then the tape autoloader returns to step 512. If the tape autoloader cannot be successfully cleared, then at step 518, the tape autoloader is stopped and at step 520, a system error is displayed on the front panel.

Returning to step 508, if the cartridge load sensor is not activated, or if the pickers 286 are in the loaded position, then the tape autoloader goes to step 514 which is the autoloader instructions.

Returning to step 506, if it is determined that the magazine is not loaded, then at step 516, it is determined whether the pickers 286 are retracted. If the pickers 286 are retracted, then at step 518, the position of the drive plate 63 is determined. If the upper limit is activated at step 520, the tape autoloader continues to step 522 to move the drive plate 63 down X steps. If the upper limit is not activated, or if the drive plate needs to be moved down from step 522, then at step 524, drive plate 63 is moved to the upper limit. At step 526, the elevator motor count is reset to zero. At step 528, it is determined whether the magazine 52 is loaded. If the magazine 52 is loaded, then the tape autoloader 40 continues to autoloader instructions step 514. If the magazine 52 is not loaded, then at step 530, the drive plate is moved down to magazine load position. At step 532, the position is verified and at step 534, on the front panels it is displayed to load magazine. At step 536, it is determined whether the magazine is loaded. If the magazine 52 is not loaded, then it is returned to step 534. If the magazine 52 is loaded, then from step 536, tape autoloader 40 returns to step 506.

Returning to step 516, if the pickers are not retracted, then at step 538, the pickers 286 are moved to a retracted position. At step 540, it is determined whether the pickers 286 are retracted. If the pickers 286 are retracted, then tape autoloader 40 returns to step 518. If the pickers are not retracted, then at step 542, the unit goes to clear jam instructions at step 514. If the unit is cleared, then at step 544, tape autoloader 40 returns to step 540. If the unit is not cleared, then at step 546, tape autoloader 40 is stopped and at step 548, a system error is displayed.

Returning to step 514, in FIG. 14b, at step 550, the current system activity is displayed. At step 552, it is determined whether a move is required. If a move is required, then at step 554, the tape autoloader 40 is checked to see if it needs to be unloaded. If the unit is unloading, then at step 556, an unloading wait is displayed. If the unit is not unloaded, then the unit goes from step 554 to step 556 and determines whether the pickers 286 are retracted. If the pickers are retracted, then at step 558, it is determined whether all cartridges 54 are unloaded. If all cartridges 54 are unloaded, then at step 560, drive plate assembly 62 is moved to a new vertical position. At step 562, the cartridge 54 is loaded. At step 564, it is determined whether the cartridge 54 has been loaded. If the cartridge 54 has been loaded, then the tape autoloader goes to step 566 to tape recording instructions. At step 568, it is determined whether any buttons 70 have been pushed. If buttons 70 have been pushed, then at step 570, it is determined whether there is power. If there is power, then at step 572, the unit records all current information to CMOS. At step 574, all power is cut off.

Returning to step 556, if the pickers 886 are not retracted, then at step 558, the pickers 286 are retracted. At step 560, it is determined whether the pickers 286 are retracted. If the pickers 286 are retracted, then the unit advances to step 558.

Returning to step 560, if the pickers are not retracted, then tape autoloader 40 advances to step 562, which is go to clear jam instructions. It is determined at step 564 whether the jam is cleared. If the jam has been successfully cleared, then tape autoloader 40 returns to step 560. If the jam is not successfully cleared, then tape autoloader 40 stops at step 566 and at step 568, a system error is displayed.

Returning to step 568, if no buttons 70 have been pushed, then at step 570, autoloader 40 instructions are checked and the unit then returns to step 552.

Returning to step 570, if there is no power, then the unit advances to step 572 where it is determined whether the unit has stopped. If tape autoloader 40 has stopped, then at step 574, all current information is recorded to CMOS. At step 576, all recording operations are stopped. At step 578, the tape autoloader displays press enter to continue. At step 580, it is determined whether enter has been pressed. If enter has been pressed, then at step 582, tape autoloader 40 goes to menu instructions.

Returning to step 572, if tape autoloader 572 has not stopped, then at step 574, it is determined whether tape autoloader 40 has been unloaded. If tape autoloader 574 has been unloaded, then at step 556, tape autoloader 40 displays unloading wait. At step 558, all current information is recorded to CMOS. At step 560, all recording operations are stopped. At step 562, the cartridges are moved into the magazine. At step 564, it is determined whether the pickers and cartridges are clear. If the pickers and cartridges are clear, then at step 566, the drive plate 63 is moved to an unload position. At step 568, the drive plate position is confirmed and at step 570, it is displayed remove magazine.

Returning to step 564, if the pickers and cartridges have not been cleared, then at step 566, the unit goes to a clear jam instruction. At step 568, it is determined whether tape autoloader 40 is clear. If tape autoloader 40 is cleared, then tape autoloader goes to step 564. If tape autoloader 40 is not clear, then the unit advances to step 570 and at step 572, a system error is displayed.

The sequence of operations begins with the housing assembly 60 being in an unloaded condition without a magazine assembly 50 loaded therein. The cross bar 220 and picker puller cam members 228 must be brought to the fully forward retracted position. In this position the pickers 286 will be in the first fully forward retracted position, the door opening mechanism 88 is in the intermediate position and the clamp arms 378 are in the horizontal position. The magazine assembly 52 is then loaded into housing assembly 60.

It should now be apparent that a tape autoloader has been described which fulfills all of the objects stated above including providing a compact autoloader in which the tape head is moved to the tape. Further, it should now be apparent that an autoloader has been described that fits within a 5¼" form factor when being loaded and when loaded with tape cartridges. Additionally, a new and unique picking mechanism clamping mechanism, cartridge door opening mechanism and cartridge release mechanism have been described.

It will be readily seen by one of ordinary skill in the art that the present invention fulfills all of the objects set forth above. After reading the foregoing specification, one of ordinary skill will be able to effect various changes, substitutions of equivalents and other various aspects of the invention as broadly disclosed herein. It is therefore intended that the protection granted hereon be limited only by the definition contained in the appended claims and equivalents thereof.

What is claimed is:

1. A tape autoloader assembly, comprising:
   a magazine assembly for holding a plurality of tape cartridges each located at a respective spaced position;
   a drive assembly movable to said respective spaced positions of each of said tape cartridges and including a read/write head for reading/writing information onto/from each of said respective tape cartridges; and
   a cartridge loading mechanism movable with said drive assembly that moves a tape cartridge at a respective spaced position from said magazine assembly to said read/write head;
   wherein said cartridge loading mechanism includes a picker puller mechanism and a clamping mechanism, both carried by said drive assembly;

wherein said picker puller mechanism includes a longitudinally extending toothed rack reciprocally driven forwardly and rearwardly by a motor and rigidly attached at one end to a transverse cross bar assembly which is movable with said rack, said cross bar assembly attached at opposite ends thereof to a pair of picker pullers which are movable with said cross bar assembly, said picker pullers movably engaged with picker pullers at the other ends thereof for engaging with a respective tape cartridge and being movable between a first retracted position out of engagement with said tape cartridge to a second position partially engaged with said tape cartridge and a third position fully engaged with said tape cartridge.

2. The tape autoloader assembly of claim 1, wherein said clamping mechanism includes a pair of longitudinally extending clamp arms pivotably mounted to said drive assembly and movable between a clamped position and an unclamped position by the movement of said cross bar assembly.

3. A method of engaging a tape cartridge with a tape drive head both of which are located within a tape autoloader, comprising the steps of:

locating at least one tape cartridge in one of several spaced positions in a tape magazine within the autoloader;

moving the tape drive head to a position corresponding to the respective position of the tape cartridge; and performing with a single motor through a set of gears:

releasing the tape cartridge at the position correspondence to the tape drive head from the tape magazine;

opening a tape cartridge door; and translating the tape cartridge to the tape drive head so that read/write operations can be performed, wherein said translating step includes engaging a pair of pickers with said tape cartridge and pulling the tape cartridge towards the tape drive head, and clamping the tape cartridge into a docked position with the tape drive head.

4. The method of claim 3, wherein the translating step includes the steps of engaging the tape cartridge and pulling the tape cartridge towards the tape drive head and clamping the tape cartridge into engagement with the tape drive head.

5. The method of claim 3, further comprising the step of aligning the tape cartridge with the tape drive head.

6. The method of claim 3, wherein the tape cartridge has at least a pair of notches and wherein the translating step is performed by at least a pair of pickers which engage corresponding notches and pull the tape cartridge into a docket position with the tape drive head.

7. The method of claim 6, wherein the pair of pickers are specially adapted to fit into the pair of notches in the tape cartridge.

8. The method of claim 3, wherein said moving step is performed by moving the tape drive head in a vertical direction.

9. The method of claim 3, wherein said translating step is performed by moving the tape cartridge in a horizontal direction.

10. The method of claim 3, wherein said moving step occurs before said translating step.

11. The method of claim 3, wherein the tape cartridge is a Travan tape cartridge.

12. The method of claim 3, further comprising the step of opening a door on the tape cartridge allowing tape within the tape cartridge to be brought into engagement with the tape drive head.

13. The method of claim 3, further comprising the step of disengaging the tape cartridge from the tape drive head and moving the tape cartridge back into the tape magazine.

14. The method of claim 3, wherein the tape autoloader has outer dimensions of approximately 3¼" H×5¾" W×8" L.

15. The method of claim 3, wherein said moving step includes the steps of vertically moving a picker puller mechanism, a cartridge release mechanism, a door opening mechanism and a cartridge clamping mechanism to a position corresponding to the respective position of the tape cartridge.

* * * * *